United States Patent
Abubakar et al.

(10) Patent No.: US 9,464,178 B2
(45) Date of Patent: *Oct. 11, 2016

(54) ARTICLES COMPRISING BROAD MOLECULAR WEIGHT DISTRIBUTION POLYPROPYLENE RESINS

(71) Applicant: ExxonMobil Chemical Patents Inc., Baytown, TX (US)

(72) Inventors: Saifudin M. Abubakar, Singapore (SG); Anthony Poloso, Houston, TX (US); Prasadarao Meka, Seabrook, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/434,836

(22) PCT Filed: Oct. 8, 2013

(86) PCT No.: PCT/US2013/063761
§ 371 (c)(1),
(2) Date: Apr. 10, 2015

(87) PCT Pub. No.: WO2014/070384
PCT Pub. Date: May 8, 2014

(65) Prior Publication Data
US 2015/0291755 A1    Oct. 15, 2015

Related U.S. Application Data

(60) Provisional application No. 61/720,610, filed on Oct. 31, 2012.

(30) Foreign Application Priority Data

Jan. 23, 2013  (EP) .................... 13152303

(51) Int. Cl.
| C08F 210/06 | (2006.01) |
| C08L 23/14 | (2006.01) |
| C08J 9/04 | (2006.01) |
| C08F 110/06 | (2006.01) |
| C08F 10/06 | (2006.01) |
| C08J 9/14 | (2006.01) |
| C08K 5/00 | (2006.01) |
| C08K 3/00 | (2006.01) |

(52) U.S. Cl.
CPC .............. *C08J 9/04* (2013.01); *C08F 10/06* (2013.01); *C08F 110/06* (2013.01); *C08J 9/141* (2013.01); *C08K 3/0008* (2013.01); *C08K 5/0008* (2013.01); *C08J 2201/03* (2013.01); *C08J 2203/14* (2013.01); *C08J 2323/12* (2013.01); *C08K 3/00* (2013.01)

(58) Field of Classification Search
CPC .... C08F 110/06; C08F 10/06; C08F 210/06; C08F 2500/11; C08F 2500/04; C08L 23/10; C08L 23/12; C08L 23/14; C08L 23/16
See application file for complete search history.

(56) References Cited

U.S. PATENT DOCUMENTS

| 5,652,303 | A | * | 7/1997 | Ishimaru | C08F 10/00 502/125 |
| 5,747,160 | A | * | 5/1998 | Pinoca | C08L 23/12 428/364 |
| 5,752,362 | A | | 5/1998 | Eichbauer | |
| 5,907,942 | A | | 6/1999 | Eichbauer | |
| 6,087,459 | A | | 7/2000 | Miro et al. | |
| 6,350,828 | B1 | | 2/2002 | Takaoka et al. | |
| 6,602,598 | B1 | | 8/2003 | Simpson et al. | |
| 6,723,795 | B1 | | 4/2004 | Dupire et al. | |
| 7,772,346 | B2 | | 8/2010 | Meesters et al. | |
| 7,807,769 | B2 | | 10/2010 | Mehta et al. | |
| 8,491,991 | B2 | * | 7/2013 | Masuda | B29C 47/0021 428/304.4 |
| 8,709,561 | B2 | * | 4/2014 | Bernreitner | B65D 1/0207 428/35.7 |
| 9,068,030 | B2 | * | 6/2015 | Song | C08F 110/06 |
| 2003/0088022 | A1 | | 5/2003 | Lin et al. | |
| 2003/0118853 | A1 | | 6/2003 | Cook et al. | |
| 2005/0159564 | A1 | | 7/2005 | Huovinen et al. | |
| 2007/0054997 | A1 | | 3/2007 | Pierini et al. | |
| 2008/0311368 | A1 | | 12/2008 | Tukachinsky | |
| 2009/0030098 | A1 | | 1/2009 | Cagnani et al. | |
| 2010/0168364 | A1 | | 7/2010 | Ernst et al. | |
| 2010/0227987 | A1 | | 9/2010 | Ito et al. | |
| 2011/0200775 | A1 | | 8/2011 | Bernreitner et al. | |
| 2012/0270039 | A1 | | 10/2012 | Tynys et al. | |

FOREIGN PATENT DOCUMENTS

| CN | 102159638 | 8/2011 | |
| CN | 102597096 | 7/2012 | |
| EP | 0 743 380 | 11/1996 | |
| EP | 0 757 069 | 2/1997 | |
| EP | 1 170 305 | 1/2002 | |
| EP | 1 882 703 | 1/2008 | |
| EP | 2 000 504 | 12/2008 | |
| EP | 2 527 376 | 11/2012 | |
| KR | 2010-0101363 | 9/2010 | |
| WO | WO 98/44011 | 10/1998 | |
| WO | WO 00/63261 | 10/2000 | |
| WO | WO 01/57099 | 8/2001 | |
| WO | WO 2007/130277 | 11/2007 | |
| WO | 2009/007265 | 1/2009 | |
| WO | WO 2010/034461 | 4/2010 | |
| WO | 2010/089123 | 8/2010 | |
| WO | WO 2011/088754 A1 | * 7/2011 | ............. C08F 10/06 |
| WO | 2011/141070 | 11/2011 | |
| WO | 2012/049690 | 4/2012 | |
| WO | 2012/150019 | 11/2012 | |
| WO | WO2014/016205 | 1/2014 | |

* cited by examiner

Primary Examiner — Rip A Lee
(74) Attorney, Agent, or Firm — Chad A. Guice; Kevin M. Faulkner

(57) ABSTRACT

Disclosed herein are molded articles, foamed articles, and foamable resins comprising a polypropylene resin comprising at least 50 mol % propylene, an MWD (Mw/Mn) of greater than 5, a branching index (g') of at least 0.95, and a melt strength of at least 20 cN determined using an extensional rheometer at 190° C. Methods of making a molded article and making a foamed article are also disclosed.

11 Claims, 2 Drawing Sheets g' Long Chain Branching of Polypropylene Resin

COMPLEX VISCOSITY OF PROPYLENE RESINS

ARTICLES COMPRISING BROAD MOLECULAR WEIGHT DISTRIBUTION POLYPROPYLENE RESINS

CROSS-REFERENCE TO RELATED APPLICATIONS

This application is a National Stage Application of International Application No. PCT/US2013/063761 filed Oct. 8, 2013, which claims the benefit of U.S. Provisional Application No. 61/720,610, filed Oct. 31, 2012, and European Application No. 13152303.7 filed Jan. 23, 2013, the disclosures of which are fully incorporated herein by their reference.

FIELD OF INVENTION

Polypropylene resins and articles made therefrom.

BACKGROUND

Polypropylene is typically not suitable for use in producing various molded articles, foamed articles, and the like. The physical properties of homopolymers of propylene formed by typical Ziegler-Natta polymerization are highly dependent on the stereoregularity of the polymer itself. Highly stereoregular polymers are generally crystalline, provide desirable high flexural moduli, and are formed with a suitable choice of electron donor. These highly crystalline polymers also display high melting points, but innately exhibit low melt flow rates (MFR) that render them generally unsuitable for applications that require high processing rates, such as in injection molding, oriented films and thermobond fibers. Further, conventional polypropylene homopolymer and copolymer products formed from highly crystalline polypropylenes lack sufficient impact resistance for many uses.

The polypropylene homopolymer or impact copolymer resins made from the traditional Ziegler-Natta catalyst based on phthalate or other aromatic containing internal electron donor systems, and a silane or diethers external electron donor, result in a molecular weight distribution (MWD) in the range of 3 to 4.5 and as such, have very low melt strength with no evidence of strain hardening under elongational extension in the melt. The resins with molecular weight distribution in the range of 3 to 4.5 are not suitable in converting processes such as blown film applications either in mono-layer or multi-layer applications due to poor melt strength. Similar behavior is observed in sheeting, deep-drawn thermoforming, and foaming applications. Other converting applications requiring good melt strength for which such polymers are not suitable include profile extrusion, base stock for thermoplastic vulcanizates (TPV), bi-axially oriented polypropylene (BOPP) film, blow molding applications, and the like.

There is a need in the art for polypropylene resins having one or more properties such as improved melt strength, improved stiffness and the like. There is also a need for such polypropylene resins suitable for use in blown film, in multi-layer applications as replacement for HDPE, sheeting, thermoforming in shallow drawn and deep drawn applications, and/or foaming applications.

Related references include EP 0 757 069 A1; EP 2 000 504 A1; US 2003-088022; US 2007-054997; US 2008-311368; U.S. Pat. No. 6,602,598; U.S. Pat. No. 5,907,942; US 2003-118853; U.S. Pat. No. 5,752,362; WO 2007/130277; WO 98/44011; and WO 2010/034461.

SUMMARY

In embodiments, a molded article comprises a polypropylene resin, wherein the polypropylene resin comprises at least 50 mol % propylene, an MWD (Mw/Mn) greater than 5, a branching index (g') of at least 0.95, and a melt strength greater than 20 cN determined using an extensional rheometer at 190° C.

In embodiments, a foamable resin comprises a propylene resin and from 0 to 10 wt % of a foaming agent, wherein prior to combination with foaming agent, the polypropylene resin comprises at least 50 mol % propylene, an MWD (Mw/Mn) greater than 5, a branching index (g') of at least 0.95, and a melt strength greater than 20 cN determined using an extensional rheometer at 190° C.

In embodiments, a foamed article comprises a propylene resin and from 0 to 10 wt % of a foaming agent, wherein the propylene resin is foamed to a density of less than or equal to 320 kg/m$^3$, wherein the polypropylene resin comprises at least 50 mol % propylene, an MWD (Mw/Mn) greater than 5, a branching index (g') of at least 0.95, and a melt strength greater than 20 cN determined using an extensional rheometer at 190° C.

In embodiments, a method of making a molded article comprises molding polypropylene resin comprising at least 50 mol % propylene, an MWD (Mw/Mn) greater than 5, a branching index (g') of at least 0.95, and a melt strength greater than 20 cN determined using an extensional rheometer at 190° C.

In embodiments, a method of making a foamed article comprises foaming a propylene resin with from 0 to 10 wt % of a foaming agent to a density of less than or equal to 320 kg/m$^3$, wherein the polypropylene resin comprises at least 50 mol % propylene, an MWD (Mw/Mn) greater than 5, a branching index (g') of at least 0.95, and a melt strength greater than 20 cN determined using an extensional rheometer at 190° C.

This summary is provided to introduce a selection of concepts that are further described below in the detailed description. This summary is not intended to identify key or essential features of the claimed subject matter, nor is it intended to be used as an aid in limiting the scope of the claimed subject matter. Other and further objects, advantages and features of the present invention will be understood by reference to claims which follow this specification.

DETAILED DESCRIPTION

Figure 1:
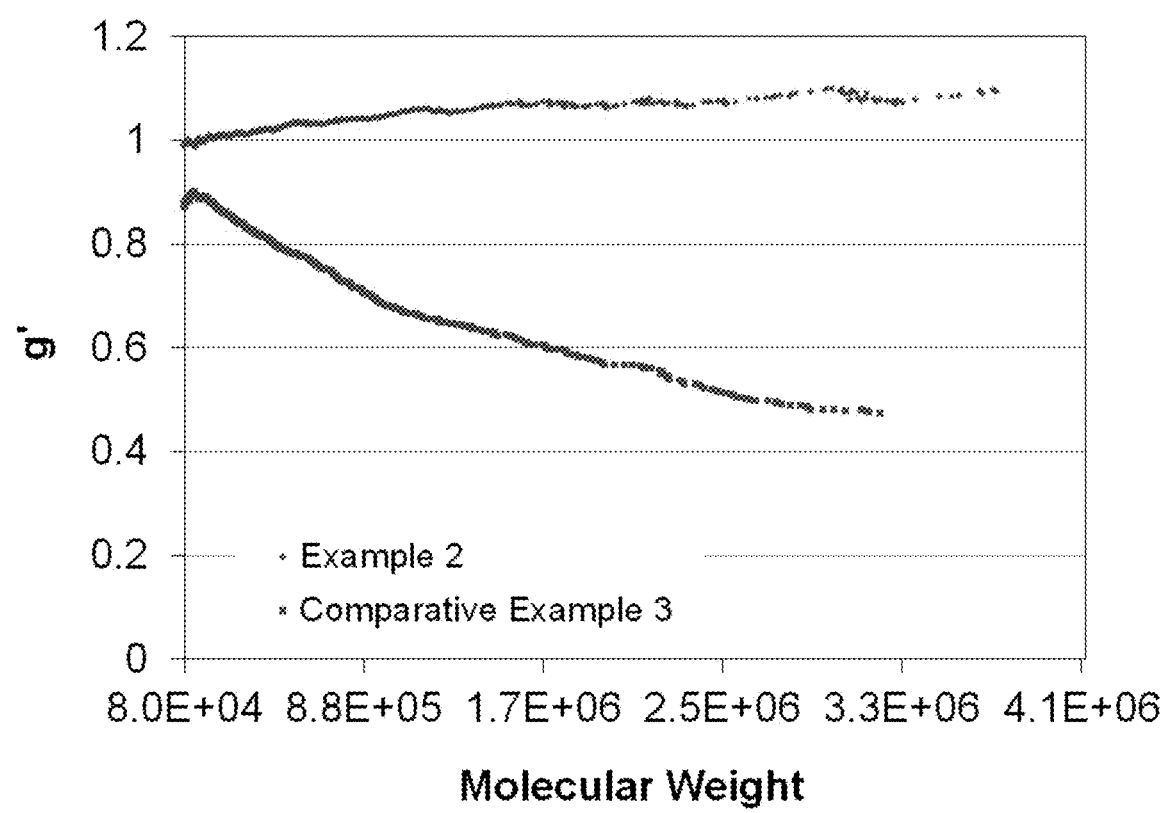
FIG. 1 is a graph plotting the intrinsic viscosity vs. molecular weight of a propylene resin produced according to the instant disclosure.

In situ polymerized materials (e.g., polypropylene) with improved melt strength, MWD, and high MFRs can be produced in a single stage polymerization conducted in the presence of certain Ziegler-Natta catalysts, which may optionally be supported, a non-aromatic internal electron donor, and a blend of two external electron donors. In any embodiment, a polypropylene resin may comprise: at least 50 mol % propylene, a melt strength of at least 20 cN or at least 50 cN determined using an extensional rheometer at 190° C., a branching index (g') of at least 0.95, and an MWD (Mw/Mn) of greater than 5. In an embodiment, a Ziegler-Natta catalyst system comprises a Ziegler-Natta catalyst comprising a non-aromatic internal electron donor and first and second external electron donors comprising different organosilicon compounds. In an embodiment, a method for making a polypropylene resin comprises contacting propylene monomers at a temperature and a pressure or other appropriate propylene polymerization conditions in the presence of the catalyst system to produce a polypropylene resin comprising at least 50 mol % propylene and a melt strength of at least 20 cN determined using an extensional rheometer at 190° C. In an embodiment, the catalyst system comprises a Ziegler-Natta catalyst comprising a non-aromatic internal electron donor and a first external electron donor having the formula $R^1{}_2Si(OR^2)_2$, wherein each $R^1$ is independently a hydrocarbyl radical comprising from 1 to 10 carbon atoms in which the carbon adjacent to the Si is a secondary or a tertiary carbon atom, and wherein each $R^2$ is independently a hydrocarbyl radical comprising from 1 to 10 carbon atoms. In an embodiment, the catalyst system further comprises a second external electron donor having the formula $R^3{}_nSi(OR^4)_{4-n}$, wherein each $R^3$ and $R^4$ are independently a hydrocarbyl radical comprising from 1 to 10 carbon atoms, n is 1, 2, or 3, and the second external electron donor is different than the first external electron donor.

In any embodiment, a molded article may comprise a polypropylene resin, wherein the polypropylene resin comprises at least 50 mol % propylene, an MWD (Mw/Mn) greater than 5, a branching index (g') of at least 0.95, and a melt strength greater than 20 cN determined using an extensional rheometer at 190° C., and/or, wherein the MWD is from 6 to 15 and an MFR from 0.1 to 100, determined according to ASTM D1238 Condition L, and/or wherein the melt strength is from 50 cN to 200 cN, and/or wherein the polypropylene resin has a viscosity ratio of from 35 to 80 determined from the complex viscosity ratio at 0.01 to 100 rad/s angular frequency at a fixed strain of 10% at 190° C., and/or wherein the polypropylene resin has a heat distortion temperature of greater than or equal to 100° C., determined according to ASTM D648 using a load of 0.45 MPa (66 psi), and/or wherein the polypropylene resin is an impact copolymer, and/or wherein the polypropylene resin comprises from 0.1 to 10 mol % of a comonomer selected from the group consisting of ethylene and $C_4$ to $C_{20}$ olefins, and/or wherein the polypropylene resin comprises an isopentad percentage of greater than 95%, and/or wherein the polypropylene resin has a stiffness of from 2000 MPa (290 kpsi) to 2500 MPa (360 kpsi) determined according to ASTM D790A on samples nucleated with 0.1% sodium benzoate, and/or wherein the polypropylene resin is produced by contacting propylene monomers at propylene polymerization conditions with a catalyst system comprising a Ziegler-Natta catalyst comprising a non-aromatic internal electron donor, and first and second external electron donors comprising different organosilicon compounds, and/or wherein the propylene resin is characterized by containing less than 1 gel having a size of 10 microns or less, and greater than 500 microns, wherein the gel content is determined by optical microscopy at 8× magnification on a 5 cm square of a blown film having a thickness of 37 microns (1.5 mils).

In any embodiment, a foamable resin may comprise a propylene resin and from 0 to 10 wt % of a foaming agent, wherein prior to combination with foaming agent, the polypropylene resin comprises at least 50 mol % propylene, an MWD (Mw/Mn) greater than 5, a branching index (g') of at least 0.95, and a melt strength greater than 20 cN determined using an extensional rheometer at 190° C., and/or wherein the resin is foamable to a density of less than or equal to 150 kg/m³, and/or wherein the MWD is from 6 to 15 and the melt strength is from 50 cN to 200 cN, and/or wherein the polypropylene resin has one or a combination of the following properties: (1) a viscosity ratio of from 35 to 80 determined from the complex viscosity ratio at 0.01 to 100 rad/s angular frequency at a fixed strain of 10% at 190° C.; (2) a heat distortion temperature of greater than or equal to 100° C., determined according to ASTM D648 using a load of 0.45 MPa (66 psi); (3) an isopentad percentage of greater than 95%; (4) an MFR from 0.1 to 100, determined according to ASTM D1238 Condition L; and (5) a stiffness of from 2000 MPa (290 kpsi) to 2500 MPa (360 kpsi) determined according to ASTM D790A on samples nucleated with 0.1% sodium benzoate.

In any embodiment, a method of making a molded article may comprise molding polypropylene resin comprising at least 50 mol % propylene, an MWD (Mw/Mn) greater than 5, a branching index (g') of at least 0.95, and a melt strength greater than 20 cN determined using an extensional rheometer at 190° C., and/or wherein the molding comprises injection molding, multi-shot injection molding, gas-assisted injection molding, extrusion blow molding, injection blow molding, injection stretch blow molding, compression molding, rotational molding, foam molding, thermoforming, sheet extrusion, profile extrusion, elasto-welding, gas foaming, film blowing, or a combination thereof, and/or the method further comprises downgauging the polypropylene resin by from 5 wt % to 10 wt %, and/or the method further comprising drawing down the polypropylene resin at a draw down depth to width ratio of greater than or equal to 2:1, and/or wherein the polypropylene resin is produced by contacting propylene monomers at propylene polymerization conditions with a catalyst system comprising a Ziegler-Natta catalyst comprising a non-aromatic internal electron donor, and first and second external electron donors comprising different organosilicon compounds.

In any embodiment, a method of making a foamed article may comprise foaming a propylene resin with from 0 to 10 wt % of a foaming agent to a density of less than or equal to 320 kg/m³, wherein the polypropylene resin comprises at least 50 mol % propylene, an MWD (Mw/Mn) greater than 5, a branching index (g') of at least 0.95, and a melt strength greater than 20 cN determined using an extensional rheometer at 190° C., and/or wherein the MWD is from 6 to 15, the melt strength is from 50 cN to 200 cN and wherein the polypropylene resin has one or a combination of the following properties: (1) a viscosity ratio of from 35 to 80 determined from the complex viscosity ratio at 0.01 to 100 rad/s angular frequency at a fixed strain of 10% at 190° C.; (2) a heat distortion temperature of greater than or equal to 100° C., determined according to ASTM D648 using a load of 0.45 MPa (66 psi); (3) an isopentad percentage of greater than 95%; (4) an MFR from 0.1 to 100, determined according to ASTM D1238 Condition L; and (5) a stiffness of from 2000 MPa (290 kpsi) to 2500 MPa (360 kpsi) determined according to ASTM D790A on samples nucleated with 0.1% sodium benzoate, and/or wherein the polypropylene resin is produced by contacting propylene monomers at propylene polymerization conditions with a catalyst system comprising a Ziegler-Natta catalyst comprising a non-aromatic internal electron donor, and first and second external electron donors comprising different organosilicon compounds.

The terms "hydrocarbyl radical," "hydrocarbyl," and "hydrocarbyl group" are used interchangeably throughout this document unless otherwise specified. For purposes of this disclosure, a hydrocarbyl radical is defined to be $C_1$ to $C_{20}$ radicals, or $C_1$ to $C_{10}$ radicals, or $C_6$ to $C_{20}$ radicals, or $C_7$ to $C_{20}$ radicals that may be linear, branched, or cyclic where appropriate (aromatic or non-aromatic); and includes hydrocarbyl radicals substituted with other hydrocarbyl radicals and/or one or more functional groups comprising elements from Groups 13-17 of the periodic table of the elements. In addition two or more such hydrocarbyl radicals may together form a fused ring system, including partially or fully hydrogenated fused ring systems, which may include heterocyclic radicals.

The term "substituted" means that a hydrogen atom and/or a carbon atom in the base structure has been replaced with a hydrocarbyl radical, and/or a functional group, and/or a heteroatom or a heteroatom containing group. Accordingly, the term hydrocarbyl radical includes heteroatom containing groups. For purposes herein, a heteroatom is defined as any atom other than carbon and hydrogen. For example, methyl cyclopentadiene (Cp) is a Cp group, which is the base structure, substituted with a methyl radical, which may also be referred to as a methyl functional group, ethyl alcohol is an ethyl group, which is the base structure, substituted with an —OH functional group, and pyridine is a phenyl group having a carbon in the base structure of the benzene ring substituted with a nitrogen atom.

For purposes herein, unless otherwise stated, a hydrocarbyl radical may be independently selected from substituted or unsubstituted methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, and triacontynyl.

For purposes herein, unless otherwise stated, a hydrocarbyl radicals may also include isomers of saturated, partially unsaturated and aromatic cyclic structures wherein the radical may additionally be subjected to the types of substitutions described above. The term "aryl", "aryl radical", and/or "aryl group" refers to aromatic cyclic structures, which may be substituted with hydrocarbyl radicals and/or functional groups as defined herein. Examples of aryl radicals include: acenaphthenyl, acenaphthylenyl, acridinyl, anthracenyl, benzanthracenyls, benzimidazolyl, benzisoxazolyl, benzofluoranthenyls, benzofuranyl, benzoperylenyls, benzopyrenyls, benzothiazolyl, benzothiophenyls, benzoxazolyl, benzyl, carbazolyl, carbolinyl, chrysenyl, cinnolinyl, coronenyl, cyclohexyl, cyclohexenyl, methylcyclohexyl, dibenzoanthracenyls, fluoranthenyl, fluorenyl, furanyl, imidazolyl, indazolyl, indenopyrenyls, indolyl, indolinyl, isobenzofuranyl, isoindolyl, isoquinolinyl, isoxazolyl, methyl benzyl, methylphenyl, naphthyl, oxazolyl, phenanthrenyl, phenyl, purinyl, pyrazinyl, pyrazolyl, pyrenyl, pyridazinyl, pyridinyl, pyrimidinyl, pyrrolyl, quinazolinyl, quinolonyl, quinoxalinyl, thiazolyl, thiophenyl, and the like.

For purposes herein the term "non-aromatic" refers to compounds, radicals, and/or functional groups without aromatic character attributed to cyclic conjugated $sp^2$ carbons having protons with a chemical shift relative to TMS consistent with aromatic protons, or greater than 6, as readily understood by one of minimal skill in the art.

It is to be understood that for purposes herein, when a radical is listed, it indicates that the base structure of the radical (the radical type) and all other radicals formed when that radical is subjected to the substitutions defined above. Alkyl, alkenyl, and alkynyl radicals listed include all isomers including where appropriate cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and nevopentyl (and analogous substituted cyclobutyls and cyclopropyls); butenyl includes E and Z forms of 1-butenyl, 2-butenyl, 3-butenyl, 1-methyl-1-propenyl, 1-methyl-2-propenyl, 2-methyl-1-propenyl, and 2-methyl-2-propenyl (and cyclobutenyls and cyclopropenyls). Cyclic compounds having substitutions include all isomer forms, for example, methylphenyl would include ortho-methylphenyl, meta-methylphenyl and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

Likewise the terms "functional group", "group," and "substituent" are also used interchangeably throughout this document unless otherwise specified. For purposes herein, a functional group includes both organic and inorganic radicals or moieties comprising elements from Groups 13, 14, 15, 16, and 17 of the periodic table of elements. Suitable functional groups may include hydrocarbyl radicals, e.g., alkyl radicals, alkene radicals, aryl radicals, and/or halogen (Cl, Br, I, F), O, S, Se, Te, $NR^*_x$, $OR^*$, $SeR^*$, $TeR^*$, $PR^*_x$, $AsR^*_x$, $SbR^*_x$, $SR^*$, $BR^*_x$, $SiR^*_x$, $GeR^*_x$, $SnR^*_x$, $PbR^*_x$, and/or the like, wherein R is a $C_1$ to $C_{20}$ hydrocarbyl as defined above and wherein x is the appropriate integer to provide an electron neutral moiety. Other examples of functional groups include those typically referred to as amines, imides, amides, ethers, alcohols (hydroxides), sulfides, sulfates, phosphides, halides, phosphonates, alkoxides, esters, carboxylates, aldehydes, and the like.

Polypropylene microstructure is determined by $^{13}$C-NMR spectroscopy, including the concentration of isotactic and syndiotactic diads ([m] and [r]), triads ([mm] and [rr]), and pentads ([mmmm] and [rrrr]). The designation "m" or "r" describes the stereochemistry of pairs of contiguous propylene groups, "m" referring to meso and "r" to racemic. Samples are dissolved in $d_2$-1,1,2,2-tetrachloroethane, and spectra recorded at 125° C. using a 100 MHz (or higher) NMR spectrometer. Polymer resonance peaks are referenced to mmmm=21.8 ppm. Calculations involved in the characterization of polymers by NMR are described by F. A. Bovey in Polymer Conformation and Configuration (Academic Press, New York 1969) and J. Randall in Polymer Sequence Determination, $^{13}$C-NMR Method (Academic Press, New York, 1977).

For purposes herein an "olefin," alternatively referred to as "alkene," is a linear, branched, or cyclic compound comprising carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer.

For purposes herein a "polymer" has two or more of the same or different "mer" units. A "homopolymer" is a polymer having mer units that are the same. A "copolymer" is a polymer having two or more mer units that are different from each other. A "terpolymer" is a polymer having three mer units that are different from each other. "Different" in reference to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

The terms "catalyst" and "catalyst compound", are defined to mean a compound capable of initiating polymerization catalysis under the appropriate conditions. In the description herein, the catalyst may be described as a catalyst precursor, a pre-catalyst compound, or a transition metal compound, and these terms are used interchangeably. A catalyst compound may be used by itself to initiate catalysis or may be used in combination with an activator, an internal electron donor, one or more external electron donors, and/or a co-catalyst to initiate catalysis.

A propylene polymer is a polymer having at least 50 mol % of propylene. As used herein, Mn is number average molecular weight as determined by proton nuclear magnetic resonance spectroscopy ($^1$H NMR) or by gel permeation chromatography (GPC) unless stated otherwise, Mw is weight average molecular weight determined by gel permeation chromatography (GPC), and Mz is z average molecular weight determined by GPC, wt % is weight percent, and mol % is mole percent. Molecular weight distribution (MWD) is defined to be Mw divided by Mn. Unless otherwise noted, all molecular weight units, e.g., Mw, Mn, Mz, are g/mol.

For purposes herein RT is room temperature, which is defined as 25° C. unless otherwise specified. All percentages are in weight percent (wt %) unless otherwise specified.

For purposes herein, Mw, Mz number of carbon atoms, g value, and $g'_{vis}$ may be determined by using a High Temperature Size Exclusion Chromatograph (either from Waters Corporation or Polymer Laboratories), equipped with three in-line detectors, a differential refractive index detector (DRI), a light scattering (LS) detector, and a viscometer. Experimental details, including detector calibration, are described in: T. Sun, P. Brant, R. R. Chance, and W. W. Graessley, Macromolecules, Volume 34, Number 19, 6812-6820, (2001) and references therein.

For purposes herein, a functionalized polymer comprises greater than 0.1 wt % of a functional group, and/or a g'<0.95, and/or is the product of a post reactor functionalization or grafting process. Accordingly, for purposes herein a non-functionalized polymer comprises less than 0.1 wt % of a functional group, and/or is not the product of a post-reactor functionalization process, and/or is not a post-reactor grafted polymer and/or has a g'>0.95 determined as described herein.

Ziegler-Natta Catalyst

Ziegler-Natta catalysts suitable for use herein include solid titanium supported catalyst systems described in U.S. Pat. No. 4,990,479 and U.S. Pat. No. 5,159,021, WO 00/63261, and others. Briefly, the Ziegler-Natta catalyst can be obtained by: (1) suspending a dialkoxy magnesium compound in an aromatic hydrocarbon that is liquid at ambient temperatures; (2) contacting the dialkoxy magnesium-hydrocarbon composition with a titanium halide and with a diester of an aromatic dicarboxylic acid; and (3) contacting the resulting functionalized dialkoxy magnesium-hydrocarbon composition of step (2) with additional titanium halide.

In any embodiment, the catalyst system may be a solid titanium catalyst component comprising magnesium, titanium, halogen a non-aromatic internal electron donor and two or more external electron donors. Examples of the titanium compound used in the preparation of the solid titanium catalyst component include tetravalent titanium compounds having the formula:

$$Ti(OR_n)X_{4-n}$$

wherein R is a hydrocarbyl radical, X is a halogen atom, and n is from 0 to 4.

In any embodiment, suitable titanium compounds for use herein include titanium tetra-halides such as $TiCl_4$, $TiBr_4$, and/or $TiI_4$; alkoxy titanium trihalides including $Ti(OCH_3)Cl_3$, $Ti(OC_2H_5)Cl_3$, $Ti(O\ n\text{-}C_4H_9)Cl_3$, $Ti(OC_2H_5)Br_3$, and/or $Ti(O\ iso\text{-}C_4H_9)Br_3$; dialkoxytitanium dihalides including $Ti(OCH_3)_2Cl_2$, $Ti(OC_2H_5)_2Cl_2$, $Ti(O\ n\text{-}C_4H_9)_2Cl_2$, and/or $Ti(OC_2H_5)_2Br_2$; trialkoxytitanium monohalides including $Ti(OCH_3)_3Cl$, $Ti(OC_2H_5)_3Cl$, $Ti(O\ n\text{-}C_4H_9)_3Cl$, and/or $Ti(OC_2H_5)_3Br$; and/or tetraalkoxy titaniums including $Ti(OCH_3)_4$, $Ti(OC_2H_5)_4$, and/or $Ti(O\ n\text{-}C_4H_9)_4$.

In any embodiment, the halogen-containing titanium compound may be a titanium tetrahalide or titanium tetrachloride. The titanium compounds may be used singly or in combination with each other. The titanium compound may be diluted with a hydrocarbon compound or a halogenated hydrocarbon compound.

In any embodiment, the magnesium compound to be used in the preparation of the solid titanium catalyst component may include a magnesium compound having reducibility and/or a magnesium compound having no reducibility. Suitable magnesium compounds having reducibility may, for example, be magnesium compounds having a magnesium-carbon bond or a magnesium-hydrogen bond. Suitable examples of such reducible magnesium compounds include dimethyl magnesium, diethyl magnesium, dipropyl magnesium, dibutyl magnesium, diamyl magnesium, dihexyl magnesium, didecyl magnesium, magnesium ethyl chloride, magnesium propyl chloride, magnesium butyl chloride, magnesium hexyl chloride, magnesium amyl chloride, butyl ethoxy magnesium, ethyl butyl magnesium, and/or butyl magnesium halides. These magnesium compounds may be used singly or they may form complexes with the organo-aluminum co-catalyst as described herein. These magnesium compounds may be a liquid or a solid.

Suitable examples of the magnesium compounds having no reducibility include magnesium halides such as magnesium chloride, magnesium bromide, magnesium iodide, and magnesium fluoride; alkoxy magnesium halides such as magnesium methoxy chloride, magnesium ethoxy chloride, magnesium isopropoxy chloride, magnesium phenoxy chloride and magnesium methylphenoxy chloride; alkoxy magnesiums such as ethoxy magnesium, isopropoxy magnesium, butoxy magnesium, n-octoxy magnesium and 2-ethylhexoxy magnesium; aryloxy magnesiums such as phenoxy magnesium and dimethylphenoxy magnesium; and/or magnesium carboxylates such as magnesium laurate and magnesium stearate.

In any embodiment, non-reducible magnesium compounds may be compounds derived from the magnesium compounds having reducibility or may be compounds derived at the time of preparing the catalyst component. The magnesium compounds having no reducibility may be derived from the compounds having reducibility by, for example, contacting the magnesium compounds having reducibility with polysiloxane compounds, halogen-containing silane compounds, halogen-containing aluminum compounds, esters, alcohols, and the like.

In any embodiment, the magnesium compounds having reducibility and/or the magnesium compounds having no reducibility may be complexes of the above magnesium compounds with other metals, or mixtures thereof with other metal compounds. They may also be mixtures of two or more types of the above compounds. In any embodiment, halogen-containing magnesium compounds including magnesium chloride, alkoxy magnesium chlorides, and aryloxy magnesium chlorides may be used.

In any embodiment, a suitable solid catalyst component may comprise a non-aromatic internal electron donor is a catalyst solid sold by Lyondell-Basell Inc. under the trade name of Avant™ ZN-168. Such a catalyst is used to exemplify the invention, other titanium supported catalyst systems are contemplated. Other catalyst use mechanisms are contemplated, including, but not limited to, batch prepolymerization, in situ prepolymerization and other such mechanisms.

Co-Catalylst

In any embodiment, supported Ziegler-Natta catalysts may be used in combination with a co-catalyst, also referred to herein as a Ziegler-Natta co-catalyst. In any embodiment, compounds containing at least one aluminum-carbon bond in the molecule may be utilized as the co-catalysts, also referred to herein as an organoaluminum co-catalyst. Suitable organoaluminum compounds include organoaluminum compounds of the general formula:

$$R^1_m Al(OR^2)_n H_p X_q$$

wherein $R^1$ and $R^2$ are identical or different, and each represents a hydrocarbyl radical containing from 1 to 15 carbon atoms, or 1 to 4 carbon atoms; X represents a halogen atom; and $0<m\leq 3$; $0\leq n<3$; $0\leq p<3$; $0\leq q<3$; and $m+n+p+q=3$.

Other suitable organoaluminum compounds include complex alkylated compounds of metals of Group I and aluminum represented by the general formula:

$$M^1 Al R^1_4$$

wherein $M^1$ is Li, Na or K and $R^1$ is as defined above.

Suitable organoaluminum compounds include compounds represented by the following general formulae:

$$R^1_m Al(OR^2)_{3-m}$$

wherein $R^1$ and $R^2$ are as defined above, and m is or $1.5\leq m\leq 3$;

$$R^1_m Al(H)_{3-m}$$

wherein $R^1$ is as defined above, X is halogen, and m is $0<m<3$, or $2\leq m<3$; and/or $$R^1_m Al(OR^2)_n X_q$$

wherein $R^1$ and $R^2$ are as defined above, X is halogen, $0<m\leq 3$, $0\leq n<3$, $0\leq q<3$, and $m+n+q=3$.

Suitable examples of the organoaluminum compounds include trialkyl aluminums such as trimethyl aluminum, triethyl aluminum and tributyl aluminum; trialkenyl aluminums such as triisoprenyl aluminum; dialkyl aluminum alkoxides such as diethyl aluminum ethoxide and dibutyl aluminum ethoxide; alkyl aluminum sesquialkoxides such as ethyl aluminum sesquiethoxide and butyl aluminum sesqui-butoxide; partially alkoxylated alkyl aluminums having an average composition represented by the general formula $R^1_{2.5}Al(OR^2)_{0.5}$; partially halogenated alkyl aluminums, for example alkyl aluminum dihalides such as ethyl aluminum dichloride, propyl aluminum dichloride and butyl aluminum dibromide; partially hydrogenated alkyl aluminums, for example alkyl aluminum dihydrides such as ethyl aluminum dihydride and propyl aluminum dihydride; and partially alkoxylated and halogenated alkyl aluminums such as ethyl aluminum ethoxychloride, butyl aluminum butoxychloride and ethyl aluminum ethoxybromide.

In any embodiment, the organoaluminum compound may comprise two or more aluminum atoms bonded through an oxygen or nitrogen atom. Examples include $(C_2H_5)_2AlOAl(C_2H_5)_2$, $(C_4H_9)_2AlOAl(C_4H_9)_2$, and/or methylaluminoxane (MAO). Other suitable examples include $LiAl(C_2H_5)_4$ and $LiAl(C_2H_5)_4$. In any embodiment, the trialkyl aluminums and alkyl-aluminums resulting from bonding of at least two aluminum compounds may be used.

In any embodiment, the co-catalyst is an organoaluminum compound that may be halogen free. Suitable halogen free organoaluminum compounds are, in particular, branched unsubstituted alkylaluminum compounds of the formula $AlR_3$, where R denotes an alkyl radical having 1 to 10 carbon atoms, such as for example, trimethylaluminum, triethylaluminum, triisobutylaluminum, and tridiisobutylaluminum. Additional compounds that are suitable for use as a co-catalyst are readily available and amply disclosed in the prior art including U.S. Pat. No. 4,990,477, which is incorporated herein by reference for purposes of U.S. patent practice. In any embodiment, the organoaluminum Ziegler-Natta co-catalyst may be trimethyl aluminum, triethyl aluminum (TEAL), or a combination thereof.

Internal Electron Donors

Electron donors suitable for use herein may be used in two ways in the formation of Ziegler-Natta catalysts and catalyst systems. In any embodiment, an internal electron donor may be used in the formation reaction of the catalyst as the transition metal halide is reacted with the metal hydride or metal alkyl. Examples of suitable internal electron donors include amines, amides, ethers, esters, esters, ketones, nitriles, phosphines, stilbenes, arsines, phosphoramides, thioethers, thioesters, aldehydes, alcoholates, and salts of organic acids. In an embodiment, the internal donor is non-aromatic. In an embodiment, the non-aromatic internal electron donor comprises an aliphatic amine, amide, ester, ether, ketone, nitrile, phosphine, phosphoramide, thioethers, thioester, aldehyde, alcoholate, carboxylic acid, or a combination thereof.

In any embodiment, the solid titanium catalyst component may be prepared using a non-aromatic internal electron donor. Examples of suitable non-aromatic internal electron donors include oxygen-containing electron donors such as alcohols, ketones, aldehydes, carboxylic acids, esters of organic or inorganic oxides, ethers, acid amides and acid anhydrides; nitrogen-containing electron donors such as ammonia, amines, nitriles, and/or isocyanates. Suitable examples include alcohols having 1 to 18 carbon atoms such as methanol, ethanol, propanol, pentanol, hexanol, octanol, 2-ethylhexanol, dodecanol, octadecyl alcohol, and the like; ketones having 3 to 15 carbon atoms such as acetone, methyl ethyl ketone, methyl isobutyl ketone, and the like; aldehydes having 2 to 15 carbon atoms such as acetaldehyde, propionaldehyde, octylaldehyde, and the like; organic acid esters having 2 to 30 carbon atoms including the esters desired to be included in the titanium catalyst component, such as methyl formate, ethyl formate, vinyl acetate, propyl acetate, octyl acetate, cyclohexyl acetate, ethyl propionate, methyl butyrate, ethyl valerate, ethyl stearate, methyl chloroacetate, ethyl dichloroacetate, methyl methacrylate, ethyl crotonate, dibutyl maleate, diethyl butylmalonate, diethyl dibutylmalonate, ethylcyclo-hexanecarboxylate, diethyl 1,2-cyclohexanedicarboxylate, di(2-ethylhexyl) 1,2-cyclohexanedicarboxylate, gamma-butyrolactone, delta-valerolactone, and/or ethylene carbonate; inorganic acid esters such as ethyl silicate and butyl silicate; acid halides having 2 to 15 carbon atoms such as acetyl chloride, and the like; ethers having 2 to 20 carbon atoms, such as methyl ether, ethyl ether, isopropyl ether, butyl ether, amyl ether, tetrahydrofuran, and the like; acid amides such as acetamide, and the like; acid anhydrides such as acetic anhydride, and the like; amines such as methylamine, ethyl-amine, triethylamine, tributylamine, tetramethyl-ethylenediamine, and the like; and nitriles such as acetonitrile, trinitrile, and the like.

In any embodiment, the non-aromatic internal electron donor may comprise a $C_1$ to $C_{20}$ diester of a substituted or unsubstituted $C_2$ to $C_{10}$ dicarboxylic acid. In any embodiment, the non-aromatic internal electron donor may be a succinate according to formula (I):

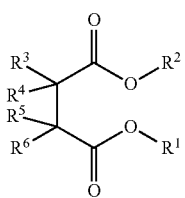

(I)

wherein $R^1$, and $R^2$ are independently $C_1$ to $C_{20}$ linear or branched alkyl, alkenyl, or cycloalkyl hydrocarbyl radicals;

$R^3$ to $R^6$ are independently, hydrogen, halogen, or $C_1$ to $C_{20}$ linear or branched alkyl, alkenyl, or cycloalkyl hydrocarbyl radicals, wherein the $R^3$ to $R^6$ radicals are not joined together, wherein at least two of the $R^3$ to $R^6$ radicals are joined to form a cyclic divalent radical, or a combination thereof.

In an embodiment, $R^3$ to $R^5$ of formula (I) are hydrogen and $R^6$ is a radical selected from the group consistent of a primary branched, secondary or tertiary alkyl or cycloalkyl radical having from 3 to 20 carbon atoms.

In any embodiment, the internal donor may be a monosubstituted non-aromatic succinate compound. In any embodiment, the internal electron donor compound may be selected from the group consisting of diethyl 2,3-diisopropylsuccinate, diisobutyl 2,3-diisopropylsuccinate, di-n-butyl 2,3-diisopropylsuccinate, diethyl 2,3-dicyclohexyl-2-methylsuccinate, diisobutyl 2,3-dicyclohexyl-2-methylsuccinate, diisobutyl 2,2-dimethylsuccinate, diethyl 2,2-dimethylsuccinate, diethyl 2-ethyl-2-methylsuccinate, diisobutyl 2-ethyl-2-methylsuccinate, diethyl 2-(cyclohexylmethyl)-3-ethyl-3-methylsuccinate, diisobutyl 2-(cyclohexylmethyl)-3-ethyl-3-methylsuccinate, and combinations thereof.

External Electron Donors

In any embodiment, in conjunction with an internal donor, two or more external electron donors may also be used in combination with a catalyst. External electron donors include, but are not limited to, organic silicon compounds, e.g., tetraethoxysilane (TEOS), methylcyclohexyldimethoxysilane (MCMS), propyltriethoxysilane (PTES), and dicyclopentydimethoxysilane (DCPMS). Internal and external-type electron donors are described, for example, in U.S. Pat. No. 4,535,068, which is incorporated herein by reference for purposes of U.S. patent practice. The use of organic silicon compounds as external electron donors is described, for example, in U.S. Pat. Nos. 4,218,339; 4,395,360; 4,328,122; and 4,473,660, all of which are incorporated herein by reference for purposes of U.S. patent practice. The external electron donors act to control stereoregularity, which affects the amount of isotactic versus atactic polymers produced in a given system. The more stereoregular isotactic polymer is more crystalline, which leads to a material with a higher flexural modulus. Highly crystalline, isotactic polymers also display lower MFRs, as a consequence of a reduced hydrogen response during polymerization. The stereoregulating capability and hydrogen response of a given external electron donor are directly and inversely related. The DCPMS donor has a substantially lower hydrogen response than the PTES donor, but produces a significantly higher level of stereoregularity than PTES.

In any embodiment, the two external electron donors A and B, also referred to herein as the first external electron donor and the second external electron donor, may be selected such that the melt flow rate MFR (A) of homopolypropylene obtained by homopolymerizing propylene by using the first external electron donor (A) in combination with the solid titanium catalyst component and the organoaluminum compound catalyst component and the MFR (B) of homopolypropylene obtained by homopolymerizing propylene by using the second external electron donor (B) under the same conditions as in the case of using the external electron donor (A) have the following relation.

$$1.2 \leq \log [MFR(B)/MFR(A)] \leq 1.4.$$

The external electron donors to be used in the preparation of the electron donor catalyst component may be those electron donors which are used in preparing the solid titanium catalyst component. In an embodiment, each of the external electron donors (A) and (B) comprise organic silicon compounds.

In any embodiment, the external electron donor may comprise an organic silicon compound of formula:

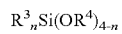

wherein $R^3$ and $R^4$ independently represent a hydrocarbyl radical and 0<n<4.

Examples of the suitable organic silicon compounds include trimethylmethoxysilane, trimethylethoxysilane, dimethyldimethoxysilane, dimethyldimethoxysilane, dimethyldiethoxysilane, diiso-propyldiethoxysilane, t-butylmethyl-n-diethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldimethoxysilane, bisethylphenyldimethoxy-silane, dicyclohexyldiethoxysilane, cyclohexylmethyl-dimethoxysilane, cyclohexylmethyldiethoxysilane, ethyltrimethoxysilane, ethyltriethoxysilane, vinyl-trimethoxysilane, methyltrimethoxysilane, n-propyltriethoxysilane, decyltrimethoxysilane, decyltriethoxy-silane, phenyltrimethoxysilane, [gamma]-chloropropyltrimethoxysilane, methyltriethoxysilane, ethyltriethoxy-silane, vinyltriethoxysilane, t-butyltriethoxysilane, n-butyltriethoxysilane, iso-butyltriethoxysilane, phenyltriethoxysilane, gamma-aminopropyltriethoxysilane, chlorotriethoxysilane, vinyltributoxysilane, cyclo-hexyltrimethoxysilane, cyclohexyltriethoxysilane, 2-norbornanetriethoxysilane, 2-norbornanemethyldimethoxy-silane, ethyl silicate, butyl silicate, trimethyl-phenoxysilane, methylallyloxysilane, vinyltris(beta-methoxyethoxysilane), vinyltriacetoxysilane, and/or dimethyltetraethoxydisiloxane.

In any embodiment, one of the two or more organic silicon compounds may comprise the formula:

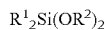

wherein $R^1$ represents a hydrocarbyl radical in which the carbon adjacent to Si is secondary or tertiary. Suitable examples include substituted and unsubstituted alkyl groups such as isopropyl, sec-butyl, t-butyl and t-amyl groups, cyclo-alkyl groups such as cyclopentyl and cyclohexyl groups, cycloalkenyl groups such as a cyclopentenyl group, and aryl groups such as phenyl and tolyl groups. In an embodiment, $R^2$ represents a hydrocarbyl radical, or a hydrocarbyl radical having 1 to 5 carbon atoms, or a hydrocarbyl radical having 1 or 2 carbon atoms.

Examples of suitable organic silicon compounds include diisopropyldimethoxysilane, diisopropyldiethoxysilane, di-sec-butyldimethoxysilane, di-t-butyldimethoxysilane, di-t-amyldimethoxysilane, dicyclopentyldimethoxysilane, dicyclohexyldimethoxy-silane, diphenyldimethoxysilane, bis-o-tolyldimethoxy-silane, bis-m-tolyldimethoxysilane, bis-p-tolyldi-methoxysilane, and/or bis-ethylphenyldimethoxysilane.

In any embodiment, the organic silicon compound may be represented by the following general formula:

$R^1{}_n Si(OR^2)_{4-n}$ wherein n is 2, $R^1$ each represents a hydrocarbyl radical, and at least one of the two hydrocarbyl radicals is a hydrocarbon group in which the carbon adjacent to Si is a primary carbon. Examples of suitable hydrocarbon groups include alkyl groups such as ethyl, n-propyl and n-butyl groups, aralkyl groups such as cumyl and benzyl groups, and alkenyl groups such as a vinyl group, and the like.

In any embodiment, $R^2$ may represent a hydrocarbyl radical or having 1 to 5 carbon atoms, or from 1 to 2 carbon atoms. Suitable examples of the organic silicon compounds in which n is 2 include diethyldimethoxysilane, dipropyldimethoxysilane, di-n-butyldimethoxysilane, dibenzyldimethoxysilane, and/or divinyldimethoxysilane.

Examples of suitable compounds when 0≤n<2 or 2<n<4 include $R^1$ being an alkyl, cycloalkyl, alkenyl, aryl, or aralkyl group and $R^2$ represents a hydrocarbyl radical having 1 to 5 carbon atoms or 1 to 2 carbon atoms.

Suitable examples of the organic silicon compounds in which 0≤n<2 or 2<n<4 include trimethylmethoxysilane, trimethylethoxysilane, methyl-phenyldimethoxysilane, methyltrimethoxysilane, t-butyl-methyldimethoxysilane, t-butylmethyldiethoxysilane, t-amylmethyldimethoxysilane, phenylmethyldimethoxysilane, cyclohexylmethyldimethoxysilane, cyclohexylmethyldi-ethoxysilane, ethyltrimethoxysilane, ethyltriethoxy-silane, vinyltriethoxysilane, methyltrimethoxysilane, methyltriethoxysilane, propyltrimethoxysilane, decyl-trimethoxysilane, decyltriethoxysilane, phenyltrimethoxysilane, propyltriethoxysilane, butyltriethoxy-silane, phenyltriethoxysilane, vinyltrimethoxysilane, vinyltributoxysilane, cyclohexyltrimethoxysilane, 2-norbornanetrimethoxysilane, and/or 2-norbornanetriethoxy-silane.

In any embodiment, the external electron donors may include methyltrimethoxysilane, ethyltrimethoxysilane, ethyltriethoxysilane, vinyltriethoxysilane, propyltrimethoxysilane, decyl-trimethoxysilane, decyltriethoxysilane, propyltri-ethoxysilane, butyltriethoxysilane, phenyltriethoxy-silane, vinyltrimethoxysilane, vinyltributoxysilane, and/or cyclohexyltrimethoxysilane.

In any embodiment, the above disclosed organic silicon compounds may be used such that a compound capable of being changed into such an organic silicon compound is added at the time of polymerizing or preliminarily polymerizing an olefin, and the organic silicon compound is formed in situ during the polymerization or the preliminary polymerization of the olefin.

In any embodiment, a first external electron donor may have the formula $R^1{}_2 Si(OR^2)_2$, wherein each $R^1$ is independently a hydrocarbyl radical comprising from 1 to 10 carbon atoms in which the carbon adjacent to the Si is a secondary or a tertiary carbon atom, and wherein each $R^2$ is independently a hydrocarbyl radical comprising from 1 to 10 carbon atoms; and a second external electron donor having the formula
$R^3{}_n Si(OR^4)_{4-n}$,
wherein each $R^3$ and $R^4$ are independently a hydrocarbyl radical comprising from 1 to 10 carbon atoms,
n is 1, 2, or 3; and the second external electron donor is different than the first external electron donor.

In any embodiment, the first external electron donor and the second external electron donor may be selected from the group consisting of tetraethoxysilane, methylcyclohexyldimethoxysilane, propyltriethoxysilane, dicyclopentyldimethoxysilane, and combinations thereof. In any embodiment, the Ziegler-Natta catalyst system may comprise 2.5 mol % to less than 50 mol % of the first external electron donor and greater than 50 mol % of a second external electron donor based on total mol % of external electron donors. In any embodiment, the first electron donor may comprise, consist of, or consist essentially of dicyclopentyldimethoxysilane (DCPMS) and the second external electron donor may comprise, consist of, or consist essentially of propyltriethoxysilane (PTES).

In any embodiment, a relationship between the first external electron donor and the second external electron donor may be defined by an equation;

$$1.2 \leq \log[MFR(B)/MFR(A)] \leq 1.4$$

wherein MFR(A) is a first melt flow rate of a homopolymer formed by polymerizing propylene monomers in the presence of the Ziegler-Natta catalyst and the first external electron donor, and wherein MFR(B) is a second melt flow rate of a homopolymer formed by polymerizing propylene monomers in the presence of the Ziegler-Natta catalyst and the second external electron donor, and wherein the MFR(A) is lower than the MFR(B).

Polymerization Process

In any embodiment, a method to make a polypropylene resin may comprise contacting propylene monomers at propylene polymerization conditions with a catalyst system to produce a polypropylene resin comprising at least 50 mol % propylene, an MWD greater than 5 and a melt strength of at least 20 cN determined using an extensional rheometer at 190° C., the catalyst system comprising: a Ziegler-Natta catalyst comprising a non-aromatic internal electron donor; and first and second external electron donors comprising different organosilicon compounds. In any embodiment, the first external electron donor may have the formula $R^1_2Si(OR^2)_2$, wherein each $R^1$ is independently a hydrocarbyl radical comprising from 1 to 10 carbon atoms in which the carbon adjacent to the Si is a secondary or a tertiary carbon atom, and wherein each $R^2$ is independently a hydrocarbyl radical comprising from 1 to 10 carbon atoms; and the second external electron donor has the formula $R^3_nSi(OR^4)_{4-n}$, wherein each $R^3$ and $R^4$ are independently a hydrocarbyl radical comprising from 1 to 10 carbon atoms, n is 1, 2, or 3, and the second external electron donor is different than the first external electron donor.

In any embodiment, the non-aromatic internal electron donor may comprise an aliphatic amine, amide, ester, ether, ketone, nitrile, phosphine, phosphoramide, thioether, thioester, aldehyde, alcoholate, carboxylic acid, or a combination thereof, or a $C_1$ to $C_{20}$ diester of a substituted or unsubstituted $C_2$ to $C_{10}$ dicarboxylic acid, or a succinate as described herein.

In any embodiment, the polymerization process according to the instant disclosure may include contacting propylene with any embodiment herein described of the catalyst system under polymerization conditions. In any embodiment, the polymerization process may include a preliminary polymerization step. In any embodiment, the preliminary polymerization may include utilizing the Ziegler-Natta catalyst system comprising the non-aromatic internal electron donor in combination with at least a portion of the organoaluminum co-catalyst, wherein at least a portion of the external electron donors are present and, wherein the catalyst system is utilized in a higher concentration than utilized in the subsequent "main" polymerization process.

In any embodiment, the concentration of the catalyst system in the preliminary polymerization, based on the moles of titanium present, may be 0.01 to 200 millimoles, or 0.05 to 100 millimoles, calculated as titanium atom, per liter of an inert hydrocarbon medium. In any embodiment, the organoaluminum co-catalyst may be present in an amount sufficient to produce 0.1 to 500 g, or 0.3 to 300 g, of a polymer per gram of the titanium catalyst present, and may be present at 0.1 to 100 moles, or 0.5 to 50 moles, per mole of the titanium atom present in the catalyst component.

In any embodiment, the preliminary polymerization may be carried out under mild conditions in an inert hydrocarbon medium in which an olefin and the catalyst components are present. Examples of the inert hydrocarbon medium used include aliphatic hydrocarbons such as propane, butane, pentane, hexane, heptane, octane, decane, dodecane, and kerosene; alicyclic hydrocarbons such as cyclopentane, cyclohexane, and methylcyclopentane; aromatic hydrocarbons such as benzene, toluene, and xylene; halogenated hydrocarbons such as ethylene chloride and chlorobenzene; and mixtures thereof. The olefin used in the preliminary polymerization may be the same as an olefin to be used in the main polymerization.

In any embodiment, the reaction temperature for the preliminary polymerization may be a point at which the resulting preliminary polymerization does not dissolve substantially in the inert hydrocarbon medium, which may be −20 to +100° C., or −20 to +80° C., or from 0 to 40° C.

Polypropylene Resins

In any embodiment, a polypropylene resin may comprise at least 50 mol % propylene, an MWD (Mw/Mn) greater than 5, a branching index (g') of at least 0.95, and a melt strength greater than 20 cN determined using an extensional rheometer at 190° C. For purposes herein, the melt strength of a polymer at a particular temperature, e.g., 190° C., is determined with a Gottfert Rheotens Melt Strength Apparatus (e.g., Gottfert Rheotens 71.97). The measurement is accomplished by grasping the extrudate from a capillary rheometer (e.g., a Gottfert Rheograph 2002 capillary rheometer), or from an extruder equipped with a capillary die, after the extrudate has been extruded 100 mm using variable speed gears and increasing the gear speed at a constant acceleration (12 mm/s$^2$, starting from an initial, zero-force calibration velocity of 10 mm/s) until the molten polymer strand breaks. The force in the strand is measured with a balance beam in conjunction with a linear variable displacement transducer. The force required to extend and then break the extrudate is defined as the melt strength. The force is measured in centinewtons (cN). A typical plot of force vs. wheel velocity is known in the art to include a resonate immediately before the strand breaks. In such cases, the plateau force is approximated by the midline between the oscillations.

One of the most distinctive improvements of the instant disclosure is an unexpectedly high melt strength. Melt strength is a key property of products used in blown film, thermoforming, blow molding processes, and the like. In a blown film process, high melt strength is required to maintain a stable bubble when running at high temperatures and/or at high production rates, especially on large lines. If the melt strength is unacceptably low, holes form in a molten web, which causes the bubble to collapse and occasionally tear off. This, in turn, results in loss of production, and can lead to subsequent quality problems if the material in the extruder begins to degrade during the down-time. Low melt strength in linear polyethylenes precludes the film manufacturer from taking advantage of the excellent draw-down characteristics inherent with most linear polyethylenes unless a melt strength enhancer, such as LDPE, is added.

In any embodiment, a polypropylene resin may comprise at least 50 mol % propylene and has a melt strength of at least 20 cN, or at least 25 cN, or at least 30 cN, or at least 35 cN, or at least 40 cN, or at least 45 cN, or at least 50 cN, or at least 55 cN, or at least 60 cN, or at least 65 cN, or at least 70 cN, or at least 75 cN, or at least 80 cN, or from 50 cN to 200 cN, or from 60 cN to 150 cN, or from 70 cN to 200 cN, or any combination thereof, determined using an extensional rheometer at 190° C., as described herein.

In any embodiment, a polypropylene resin may comprise at least 50 mol % propylene and has an MWD (Mw/Mn) of greater than 5, or greater than or equal to 6, or from 6 to 20, or from 6 to 15, or any combination thereof.

In any embodiment, a polypropylene resin further may comprise at least 75 mol %, or at least 80 mol %, or at least 90 mol %, or at least 95 mol %, or at least 99 mol % propylene. In any embodiment, a polypropylene resin may be a propylene homopolymer.

In any embodiment, a polypropylene resin may comprise from 0.1 to 10 mol % of a comonomer. In any embodiment, the comonomer may be an alpha olefin. In any embodiment, the comonomer may be selected from the group consisting of ethylene and $C_4$ to $C_{20}$ olefins.

In any embodiment, a polypropylene resin may have a branching index (g') of at least 0.95, or at least 0.99.

In any embodiment, a polypropylene resin may have a stiffness (flexural modulus) of greater than 2000 MPa, or greater than 2100 MPa, or 290 kpsi (2000 MPa) to 360 kpsi (2500 MPa) determined according to ASTM D790A on samples nucleated with 0.1% sodium benzoate.

In any embodiment, the polypropylene may have a flexural modulus which is 5%, or 10%, or 15%, or 20%, or 25% greater than a flexural modulus of a comparative polypropylene homopolymer when measured according to ASTM D790A. In any embodiment, the comparative polypropylene homopolymer may be produced in essentially the same way as the polypropylene according to the instant disclosure, except in the absence of a non-aromatic internal electron donor. In any embodiment, the comparative polypropylene homopolymer may be produced in essentially the same way as the polypropylene according to the instant disclosure, except that an aromatic internal electron donor is employed. Examples of comparative polypropylene for purposes herein include Comparative Example 2 disclosed herein, which was produced with a THC-133 type of catalyst solids made by Toho Titanium Co., which has phthalate internal electron donor (i.e., an aromatic internal electron donor) and methyl cyclohexyl dimethoxy silane as an external electron donor.

In any embodiment, a polypropylene resin may have a viscosity ratio of greater than or equal to 35, or 40, or 45, or from 35 to 80 determined at an angular frequency ratio of 0.01 and at an angular frequency ratio of 100 rad/s (at an angular frequency ratio of 0.01 to 100 rad/s) at a fixed strain of 10% at 190° C.

In any embodiment, a polypropylene resin may have a MFR range from 0.1 to 100, or from 0.3 to 10, when determined according to ASTM D1238 Condition L.

In any embodiment, a polypropylene resin may be an impact copolymer. For purposes herein, an impact copolymer refers to a resin comprising a homopolymer made in a bulk polymerization reactor followed by transferring the granules to the gas phase reactor and making ethylene-propylene rubber within the granules.

In any embodiment, the polypropylene resin may be a non-functionalized polymer or resin. For purposes herein, a non-functionalized resin does not comprise grafted or otherwise post-reactor processed olefin polymers. By functionalized (or grafted) it is meant that various functional groups are incorporated, grafted, bonded to, and/or physically or chemically attached to the polymer backbone of the polymer being functionalized after formation of the base polymer. For purposes herein, functionalized polymers further include polymers grafted onto other polymers.

In any embodiment, a functionalized polymer may be considered to have indications of long chain branching (i.e., a g' less than 0.95), consistent with the cross-linking and intermolecular bonding associated with functionalized polymers.

For purposes herein, a functionalized polymer comprises greater than 0.1 wt % of a functional group and/or a g'<0.95, and/or is the product of a post reactor functionalization or grafting process. Accordingly, in any embodiment, a non-functionalized polymer may comprise less than 0.1 wt % of a functional group, and/or is not the product of a post-reactor functionalization process, and/or is not a post-reactor grafted polymer and/or has a g'>0.95 determined as described herein.

In any embodiment, the resin may be produced by contacting propylene monomers at propylene polymerization conditions with a catalyst system comprising a Ziegler-Natta catalyst comprising a non-aromatic internal electron donor, and first and second external electron donors comprising different organosilicon compounds.

In any embodiment, the resin may be free of functionalized polypropylene or comprises less than 5 weight percent of functional groups selected from hydroxide, aryls, substituted aryls, halogens, alkoxys, carboxylates, esters, acrylates, and carboxyl, based upon the weight of the polypropylene resin, and wherein the number of carbons of the polypropylene resin involved in olefinic bonds is less than 5% of the total number of carbon atoms in the resin. In any embodiment, the resin may be free of post-reactor grafted polypropylene or comprises less than 5 percent by weight of post-reactor grafted polypropylene.

In any embodiment, a polypropylene resin may have a heat distortion temperature of greater than or equal to 100° C., determined according to ASTM D648 using a load of 0.45 MPa (66 psi).

In any embodiment, a polypropylene resin may have an isopentad percentage of greater than 90%, or greater than 95%, or greater than 99%.

In any embodiment, a polypropylene resin may have at least 50 mol % propylene, an MWD (Mw/Mn) greater than 5, a branching index (g') of at least 0.95, and a melt strength greater than 20 cN determined using an extensional rheometer at 190° C., wherein the resin is produced by contacting propylene monomers at a temperature and a pressure according to any method or process disclosed herein utilizing any embodiment or combination of embodiments of the catalyst system as disclosed herein.

In any embodiment, a polypropylene resin may comprise at least 50 mol % propylene, an MWD (Mw/Mn) greater than 5, a branching index (g') of at least 0.95, and a melt strength greater than 20 cN determined using an extensional rheometer at 190° C., wherein the resin is produced by contacting propylene monomers at a temperature and a pressure in the presence of catalyst system comprising a Ziegler-Natta catalyst comprising a non-aromatic internal electron donor and two or more external electron donors. In any embodiment, the first external electron donor may have the formula $R^1{}_2Si(OR^2)_2$, wherein each $R^1$ is independently a hydrocarbyl radical comprising from 1 to 10 carbon atoms in which the carbon adjacent to the Si is a secondary or a tertiary carbon atom, and wherein each $R^2$ is independently a hydrocarbyl radical comprising from 1 to 10 carbon atoms; and the second external electron donor may have the formula $R^3{}_nSi(OR^4)_{4-n}$, wherein each $R^3$ and $R^4$ are independently a hydrocarbyl radical comprising from 1 to 10 carbon atoms, wherein n is 1, 2, or 3; and wherein the second external electron donor is different than the first external electron donor.

Additives

A polypropylene resin according to any of the embodiments disclosed herein and molded articles produced therefrom may comprise a blend of various additive components. The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder.

Additionally, additives may be included in the blend, in one or more components of the blend, and/or in a product formed from the blend, such as a molded article, a foam, a film, or the like. Such additives are well known in the art and in an embodiment may include: reinforcing fillers, non-reinforcing fillers; scratch resistant agents; plasticizers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; extender oils, lubricants; talc; anti-fogging agents; foaming agents; flame/fire retardants; blowing agents, vulcanizing or curative agents, vulcanizing or curative accelerators, cure retarders, processing aids, tackifying resins, and other processing aids known in the polymer compounding art; or a combination thereof.

Accordingly, in any embodiment, a polypropylene resin further may comprise greater than or equal to 0.01 wt % of one or more additives selected from the group consisting of reinforcing fillers; non-reinforcing fillers; scratch resistant agents; plasticizers; antioxidants; phosphites; anti-cling additives; tackifiers; UV stabilizers; heat stabilizers; anti-blocking agents; release agents; anti-static agents; pigments; colorants; dyes; waxes; silica; extender oils; lubricants; talc; anti-fogging agents; foaming agents; flame/fire retardants; blowing agents; vulcanizing agents; curative agents; vulcanizing accelerators; curative accelerators; cure retarders; processing aids; tackifying resins; and a combination thereof.

The list described herein is not intended to be inclusive of all types of additives which may be employed with the present invention. Upon reading this disclosure, those of skilled in the art will appreciate other additives may be employed to enhance properties.

As is understood by the skilled in the art, the blends of the present invention may be modified to adjust the characteristics of the blends as desired. The aforementioned additives may be either added independently or incorporated into an additive or master batch. Such additives may comprise up to 70 wt %, or up to 65 wt %, of the total composition.

In any embodiment, fillers and extenders which can be utilized include conventional or nanosized inorganics such as calcium carbonate, clays, silica, talc, titanium dioxide, carbon black, mica, silicate, combinations thereof, and the like. Extender oils, processing oils, and/or plasticizers may also be used.

In any embodiment the propylene resin according to the instant disclosure and molded articles therefrom may also comprise slip agents or mold-release agents to facilitate moldability present at 0.005 wt % to 1 wt % (50 to 10000 ppm), or 50 to 5000 ppm, or 0.01 to 0.5 wt % (100 to 5000 ppm), based upon the weight of the composition. Desirable slip additives include, but are not limited to saturated fatty acid amides (such as palmitamide, stearamide, arachidamide, behenamide, stearyl stearamide, palmityl pamitamide, and stearyl arachidamide); saturated ethylene-bis-amides (such as stearamido-ethyl-stearamide, stearamido-ethyl-palmitamide, and palmitamido-ethyl-stearamide); unsaturated fatty acid amides (such as oleamide, erucamide, and linoleamide); unsaturated ethylene-bis-amides (such as ethylene-bis-stearamide, ethylene-bis-oleamide, stearyl-erucamide, erucamido-ethyl-erucamide, oleamido-ethyl-oleamide, erucamido-ethyl-oleamide, oleamido-ethyl-erucamide, stearamido-ethyl-erucamide, erucamido-ethyl-palmitamide, and palmitamido-ethyl-oleamide); glycols; polyether polyols (such as Carbowax); acids of aliphatic hydrocarbons (such as adipic acid and sebacic acid); esters of aromatic or aliphatic hydrocarbons (such as glycerol monostearate and pentaerythritol monooleate); styrene-alpha-methyl styrene; fluoro-containing polymers (such as polytetrafluoroethylene, fluorine oils, and fluorine waxes); silicon compounds (such as silanes and silicone polymers, including silicone oils, modified silicones and cured silicones); sodium alkylsulfates, alkyl phosphoric acid esters; stearates such as zinc stearate and mixtures thereof. Preferred slip additives are unsaturated fatty acid amides, which are available from Crompton (Kekamide™ grades) and Croda Universal (Crodamide™ grades).

In any embodiment, scratch resistant agents suitable for use herein include talc, fatty acid (oleamide and erucamide), inosilicate such as wollastonite, pectolite or okenite, high MW silicones, ionomers, and others. Some of the slip agents and fillers described above can also serve as scratch resistant agents. Examples of suitable scratch resistance improving polymers for use herein include high molecular weight silicone rubbers, such as polysiloxanes, having molecular weights of from a few hundred to several hundred thousand g/mol, with corresponding viscosities of 1 to 10 million mm$^2$/s Polysiloxanes, suitable for use herein include polydimethylsiloxanes. The Mw's of preferred polysiloxanes are at least 50,000 g/mol, or at least 100,000 g/mol, or at least 200,000 g/mol. The viscosities of polysiloxanes are at least 10,000 mm$^2$/s, or at least 100,000 mm$^2$/s, or at least 1,000,000 mm$^2$/s. The polysiloxanes may be used as neat materials or mixed via extrusion with various thermoplastics. The ultra-high molecular weight, ultra-high viscosity polysiloxanes are typically solid, pellet form blends of a thermoplastic polymer and 25 to 50 wt % of the polysiloxane. Examples for such polysiloxane masterbatches are the commercially available products MB50 available from Dow Corning, e.g., MB50-0002 or MB50-321.

In any embodiment, suitable additives may include a nanocomposite, which is a blend of polymer with one or more organo-clays. Illustrative organo-clays can include one or more of ammonium, primary alkylammonium, secondary alkylammonium, tertiary alkylammonium, quaternary alkylammonium, phosphonium derivatives of aliphatic, aromatic or arylaliphatic amines, phosphines or sulfides or sulfonium derivatives of aliphatic, aromatic or arylaliphatic amines, phosphines or sulfides. Further, the organo-clay can be selected from one or more of montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, vermiculite, halloysite, aluminate oxides, hydrotalcite, illite, rectorite, tarosovite, ledikite, and/or florine mica.

When present, the organo-clay is included in the nanocomposite at from 0.1 to 50 wt %, based on the total weight of the nanocomposite. The stabilizing functionality may be selected from one or more of phenols, ketones, hindered amines, substituted phenols, substituted ketones, substituted hindered amines, and combinations thereof. The nanocomposite can further comprise at least one elastomeric ethylene-propylene copolymer present in the nanocomposite at from 1 to 70 wt %, based on the total composition.

The additives such as fillers and oils can be introduced into the polymer during the polymerization, into the effluent from the polymerization zone, or added into the polymer after removal of solvent or diluent through melt blending.

Additional polymers can also be added to polypropylene polymers disclosed herein. Suitable additional polymers include thermoplastic resins or thermoplastic elastomers.

Exemplary thermoplastic resins include crystalline polyolefins. Also, suitable thermoplastic resins may include copolymers of polyolefins with styrene, such as a styrene-ethylene copolymer. In one or more embodiments, the thermoplastic resins additives are formed by polymerizing ethylene or alpha-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene or propylene with another alpha-olefin such as 1-butene, 1-hexene, 1-octene, 2-methyl-1-propene, 3-methyl-1-pentene, 4-methyl-1-pentene, 5-methyl-1-hexene, or mixtures thereof are also contemplated. Specifically included are the homo-polypropylene, impact, and random copolymers of propylene with ethylene or the higher alpha-olefins, described above. In any embodiment, the homo-polypropylene may have a melting point of at least 130° C., for example at least 140° C. and or less than or equal to 170° C., a heat of fusion of at least 75 J/g, alternatively at least 80 J/g, as determined by DSC analysis, and weight average molecular weight (Mw) of at least 50,000, alternatively at least 100,000. Comonomer contents for these propylene copolymers will typically be from 1% to 30% by weight of the polymer (See, for example, U.S. Pat. Nos. 6,268,438; 6,288,171; and 6,245,856). Copolymers available under the trade name VISTAMAXX™ (ExxonMobil, Houston Tex.) are specifically included. Blends or mixtures of two or more polyolefin thermoplastics such as described herein, or with other polymeric modifiers, are also suitable in accordance with this invention. These homopolymers and copolymers may be synthesized by using an appropriate polymerization technique known in the art such as, but not limited to, the conventional Ziegler-Natta type polymerizations, and catalysis employing single-site organometallic catalysts including, but not limited to, metallocene catalysts.

Molded Articles

In any embodiment, a molded article comprises one or more embodiments of the propylene resin disclosed herein, produced by an embodiment of a method to produce the propylene resin disclosed herein.

In any embodiment, the propylene polymer may be suitable for use in injection molding applications, where due to the broad MWD, the inventive polymer shear thins to a greater extent than comparative polypropylene under injection molding conditions, resulting in a lower melt pressure and an improvement in filling the mold. Benefits of using the instant propylene polymer include lower molding cycle times, and/or a reduced melt pressure for a given MFR BMWD product in comparison to a comparative polypropylene resin having the same MFR.

In any embodiment, the propylene polymer may be suitable for use in profile extrusion, where the polymer melt is extruded into a continuous shape such as pipe or other more complex structure such as a window frame having a more complex geometry, which are currently made with polyvinyl chloride (PVC). Because of the complex geometry of the profile for particular extrusions, polypropylene resin known in the art is unable to extrude into the window profile. However, the polypropylene resin according to the instant disclosure is shown to extrude and provide a complex profile without collapsing the structure.

The propylene polymer according to any one of the embodiments disclosed herein is suitable for use as a base stock for thermoplastic vulcanizates (TPV), where polypropylene base resin (the continuous phase), ethylene-propylene diene rubber (the discontinuous phase), and processing oils are chemically reacted to form thermoplastic vulcanizates. Suitable examples include the TPVs utilized in soft-touch applications such as tooth brush handles, grips to the tools such as screw drivers, and the like. The polypropylene resin according to the instant disclosure provides an improved processability of the TPV, without negatively affecting the physical properties of the TPV composition.

The term dynamic vulcanization refers to a vulcanization or curing process for a rubber contained in a thermoplastic elastomer composition, wherein the rubber is vulcanized, preferably under conditions of high shear, at a temperature above the melting point of the polyolefin component. During dynamic vulcanization, the rubber is simultaneously cross-linked (cured) and dispersed as fine particles within the polyolefin matrix, although other morphologies may also exist. Dynamic vulcanization is effected by mixing the thermoplastic elastomer components at elevated temperature in conventional mixing equipment such as roll mills, Banbury mixers, Brabender mixers, continuous mixers, mixing extruders, and the like. One method for preparing thermoplastic vulcanizates is described in U.S. Pat. No. 4,594,390, which is incorporated herein by reference, although methods employing low shear rates can also be used.

The propylene polymer according to any one of the embodiments disclosed herein, is suitable for use as a base stock in automotive compounding formulations, where the polypropylene resin according to the instant disclosure provides an improved processability having better stiffness-impact balance relative to polypropylene known in the art.

The propylene polymer according to any one of the embodiments disclosed herein, is suitable for use as a base stock in appliance formulations containing various fillers such as talc or calcium carbonate. Due to the higher stiffness of the polypropylene resin according to the instant disclosure, the amount of the filler added in the formulation could be reduced to achieve similar stiffness as compared to the polypropylene resins known in the art. As such, the polypropylene resin according to the instant disclosure provides a lower product density, which in-turn, lowers the end use part weight.

The propylene polymer according to any one of the embodiments disclosed herein, is suitable for use in blow molding applications where a molten parison is extruded and is captured by mold cavity and the parison is blown to take the shape of the mold. Examples of these articles include bottles, and the like. The high melt strength of the polypropylene resin according to the instant disclosure allows much larger heavier parts to be blow molded, as compared to propylene resins known in the art.

The propylene polymer according to any one of the embodiments disclosed herein, is suitable for use in extrusion coating applications, where the polymer melt is extruded as a coating layer over a substrate which may include polymeric and/or other substrates.

In any embodiment, molded article may comprise any propylene polymer disclosed herein.

The propylene resin according to the instant disclosure and molded articles therefrom may be used in any known application involving molding or extrusion, including consumer goods, industrial goods, construction materials, packaging materials, and automotive parts. In an embodiment, the propylene resin according to the instant disclosure may be molded into desirable end use articles by any suitable means known in the art, including but not limited to, injection molding, multi-shot injection molding, gas-assisted injection molding, extrusion blow molding, injection blow molding, injection stretch blow molding, rotational molding, foam molding, thermoforming, sheet extrusion, profile extrusion, elasto-welding, gas foaming, film blowing, compression molding, or a combination thereof, as is readily known to one having minimal skill in the art.

For purposes herein, thermoforming includes a process of forming at least one pliable plastic sheet into a desired shape. Thermoforming may be accomplished by vacuum, positive air pressure, plug-assisted vacuum forming, or combinations and variations of these, once a sheet of material reaches thermoforming temperatures, typically of from 140° C. to 185° C. or higher. A pre-stretched bubble step may be used, especially on large parts, to improve material distribution. In an embodiment, plug-assisted forming is suitable for use herein, generally for small, deep drawn parts. For the good behavior in thermoforming, the lowest melt flow rate polymers are desirable. Blow molding is another suitable forming means, which includes injection blow molding, multi-layer blow molding, extrusion blow molding, and stretch blow molding, and may be suitable for closed or hollow objects, such as, for example, gas tanks and other fluid containers. Blow molding is described in more detail in, for example, CONCISE ENCYCLOPEDIA OF POLYMER SCIENCE AND ENGINEERING pp. 90-92 (Jacqueline I. Kroschwitz, ed., John Wiley & Sons 1990).

In any embodiment, profile co-extrusion can be used. In any embodiment, an injection molding process may be used. Molded articles according to the instant disclosure may be fabricated by injecting molten polymer into a mold that shapes and solidifies the molten polymer into desirable geometry and thickness of molded articles. Sheets may be made either by extruding a substantially flat profile from a die, onto a chill roll, or alternatively by calendaring. In any embodiment, sheets suitable for producing molded articles may have a thickness of from 0.25 mm to 2.5 mm (10 mils to 100 mils), although sheets may be substantially thicker. Tubing or pipe may be obtained by profile extrusion as is known in the art. In any embodiment, tubing may have an outside diameter from 3.1 mm to 25 mm and a wall thickness in the range of from 0.25 mm to 5 mm. In an embodiment, pipe according to the instant disclosure may be in the range of from 25 mm to 1500 mm in outside diameter, and have a wall thickness of in the range of from 5 mm to 100 mm. Sheets made from the products of an embodiment of a version of the present invention may be used to form containers. Such containers may be formed by thermoforming, solid phase pressure forming, stamping, and other shaping techniques. Sheets may also be formed to cover floors or walls or other surfaces.

For purposes herein, the depth of draw, also referred to as the draw down depth to width ratio, or simply as the draw down ratio of a thermoforming process is the ratio of average sheet thickness divided by average article thickness. The depth a thermoplastic material is drawn is important to determining the best thermoforming technique because it is a prime factor controlling the final average thickness of the formed part. For purposes herein, a deep draw down depth to width ratios is greater than or equal to 1.4. In any embodiment, the propylene resin according to the instant disclosure may be used to produce molded articles therefrom at a draw down depth to width ratio of greater than or equal to 1:1, or 1.5:1, or 1.6:1, or 1.7:1, or 1.8:1, or 1.9:1, or 2.0:1, or 2:1, or 5:1, or 10:1, or wherein the article is produced at a draw down depth to width ratio of greater than or equal to 1.1 to 2.1:1.

In any embodiment, the thermoformed sheet may have a thickness range of 0.1 mm to 20 mm (3.9 to 787 mils), or 0.3 mm to 12.7 mm (12 mils to 500 mils). Examples include refrigerator liners having a thickness range from 5 mm to 6.4 mm (200 mils to 250 mils).

It will be understood by those skilled in the art that the steps outlined above may be varied, depending upon the desired result. For example, the extruded sheet of the compositions of this invention may be directly thermoformed or blow molded without cooling, thus skipping a cooling step. Other parameters may be varied as well in order to achieve a finished composite article having desirable features.

In an embodiment, the propylene resin according to the instant disclosure and molded articles therefrom may be used to produce cookware, storageware, toys, medical devices, medical containers, healthcare items, sheets, crates, containers, bottles, packaging, wire and cable jacketing, pipes, sporting equipment, chair mats, tubing, profiles, instrumentation sample holders and sample windows, automotive, boat and water craft components, and other such articles. In particular, the compositions are suitable for automotive components such as trim parts, parts for dashboards and instrument panels, mirror housing, body panel, protective side molding, and other interior and external components associated with automobiles, trucks, boats, and other vehicles.

In an embodiment, the propylene resin according to the instant disclosure is suitable to produce a molded articles therefrom downgauged relative to an ethylene homopolymer. In an embodiment, the molded article is a downgauged article. In an embodiment, the molded article is downgauged at least a 5%, or from 5% to 10% relative to an article prepared via an identical process in the absence of the propylene resin according to the instant disclosure.

In an embodiment, the propylene resin according to the instant disclosure produces sheets and molded articles which are essentially gel-free. For purposes herein, gel defects are determined visually utilizing a blown film having a thickness of 1.5 mils (0.04 mm) The area analyzed is 5 cm×5 cm. The defects in the film are first identified visually using optical microscopy at 8× magnification, then quantified in terms of the number of gel defects per unit area having a particular size or which fit within a particular range of sizes. The sizes reported are typically gel defects having a size (e.g., having a major axis or having a diameter of) greater than 500 microns and less than 10 microns. In any embodiment, the propylene resin produces films, sheets, and molded articles having less than 10 gels, or less than 5 gels, or less than 1 gel having a size of 1 micron or larger, when determined using optical microscopy at 8× magnification in a 5 cm square of a blown film having a thickness of 1.5 mils. In an embodiment, the propylene resin according to the instant disclosure produces films, sheets and molded articles having less than 10 gels, or less than 5 gels, or less than 1 gel having a size of less than 10 microns, of greater than 500 microns, or both, when determined using optical microscopy at 8× magnification in a 5 cm square of a blown film having a thickness of 1.5 mils. In an embodiment, the propylene resin according to the instant disclosure produces films, sheets and molded articles which are essentially free of gels having a size of 10 microns or less, of greater than 500 microns, or both, when determined using optical microscopy at 8× magnification in a 5 cm square of a blown film having a thickness of 0.04 mm (1.5 mils). Accordingly, in an embodiment, a molded article according to the instant disclosure comprises a propylene resin characterized by containing less than 10, or less than 5 or less than 1 (i.e., is essentially free from) total of gels having a size of 10 microns or less, and greater than 500 microns, wherein the gel content is determined by optical microscopy at 8× magnification of a 5 cm square of a blown film having a thickness of 0.04 mm (1.5 mils). In an embodiment, the optical microscopy is conducted at 8× magnification with a magnifier e.g., Fischer part # FIS#12-071-6C, or an equivalent thereof, also referred to in the art as a watchmaker loupe magnifier.

Foamable Polypropylene Resin Compositions

In any embodiment, a foamable resin may comprise the propylene resin according to the instant disclosure and from 0 to 10 wt % of a foaming agent. In any embodiment, prior to combination with the foaming agent, the polypropylene resin may comprise at least 50 mol % propylene; an MWD (Mw/Mn) greater than 5; a branching index (g') of at least 0.95; and a melt strength greater than 20 cN determined using an extensional rheometer at 190° C., and the foamed resin has a density of less than or equal to 320 kg/m$^3$.

The foamable and foamed compositions of this invention typically utilize a foaming agent to cause expansion of the polymers by foaming. In any embodiment, suitable foaming agents include both physical foaming agents and chemical foaming agents. Chemical foaming agents include azodicarbonamide, azodiisobutyro-nitrile, benzenesulfonhydrazide, 4,4-oxybenzene sulfonylsemicarbazide, p-toluene sulfonyl semi-carbazide, barium azodicarboxylate, N,N'-dimethyl-N, N'-dinitrosoterephthalamide, and trihydrazino triazine. Chemical foaming agents also include organic foaming agents including aliphatic hydrocarbons having 1-9 carbon atoms, halogenated aliphatic hydrocarbons having 1-4 carbon atoms, and aliphatic alcohols having 1-3 carbon atoms. Aliphatic hydrocarbons include methane, ethane, propane, n-butane, isobutane, n-pentane, isopentane, neopentane, and the like. Chemical foaming agents may also include halogenated hydrocarbons, or fluorinated hydrocarbons. Aliphatic alcohols useful as foaming agents include methanol, ethanol, n-propanol, and isopropanol.

Suitable inorganic foaming agents useful in making the foams of the present invention include carbon dioxide, nitrogen, argon, water, air, nitrogen, and helium. Inorganic foaming agents also include sodium bicarbonate; sodium carbonate; ammonium bicarbonate; ammonium carbonate; ammonium nitrite; nitroso compounds, such as N,N'-dimethyl-N,N'-dinitrosoterephthalamide and N,N'-dinitrosopentamethylene tetramine; azo compounds, such as azodicarbonamide, azobisisobutylonitrile, azocyclohexylnitrile, azodiaminobenzene, and bariumazodicarboxylate; sulfonyl hydrazide compounds, such as benzene sulfonyl hydrazide, toluene sulfonyl hydrazide, p,p'-oxybis(benzene sulfonyl hydrazide), and diphenyl sulfone-3,3'-disulfonyl hydrazide; and azide compounds, such as calcium azide, 4,4'-diphenyl disulfonyl azide, and p-toluene sulfonyl azide.

In any embodiment, the amount of foaming agent incorporated into the polymer to produce a foam-forming polymer composition may be from 0.01 to 10 wt %, or from 0.1 to 5 wt %, based on the total material in the blend. The level of foaming agent is often altered to obtain a desired foam density.

In any embodiment, a foaming assistant can be used with the foaming agent. The simultaneous use of the foaming agent with a foaming assistant contributes to lowering of the decomposition temperature of the foaming agent, acceleration of decomposition and homogenization of bubbles. Examples of the foaming assistant may include organic acids such as salicylic acid, phthalic acid, stearic acid, nitric acid, urea and derivatives thereof. In an embodiment, the amount of foaming assistant incorporated into the polymer composition is from 0.01 to 10 wt %, or from 0.1 to 5 wt %, or 0.5 to 3 wt %, based on the total material in the composition.

Foamed Articles

In any embodiment, the propylene resin according to the instant disclosure can be processed in similar ways as any other polyolefins useful in foaming processes. The foam article or composition can be produced by a number of methods, such as compression molding, injection molding and hybrids of extrusion and molding. The process can comprise mixing the polymers under heat to form a melt, along with foaming agents and other typical additives, to achieve a homogeneous or heterogeneous composition. The components may be mixed and blended by any means known in the art, such as with a Banbury, intensive mixers, two-roll mill, and extruder. Time, temperature, and shear rate may be regulated to ensure optimum dispersion without premature foaming A high temperature of mixing may result in premature foaming by decomposition of foaming agents or cell collapse due to lack of stabilization of the structure. When the melt temperature is too low, foaming is limited because the material solidifies before the cells have the possibility to expand fully. An adequate temperature is desired to insure good mixing of polymers and the dispersion of other ingredients. The upper temperature limit for safe operation may depend on the onset decomposition temperatures of foaming agents employed. The decomposition temperature of some foaming agents is lower than the melt temperature of the polymer. In this case, the polymers may be melt-blended before compounded with other ingredient(s). The resultant mixture can be then compounded with the other components. Extruders with staging cooling/heating may also be employed. The latter part of the foam extruder is dedicated to the melt cooling and intimate mixing of the polymer-foaming agent system. After mixing, shaping can be carried out. Sheeting rolls or calendar rolls are often used to make appropriately dimensioned sheets for foaming. An extruder may be used to shape the composition into pellets. Foaming can be carried out in a compression mold at a temperature and time to complete the decomposition of foaming agents. Pressures, molding temperature, and heating time may be controlled. Foaming can be carried out in an injection molding equipment by using foam composition in pellet form. The resulting foam can be further shaped to the dimension of finished products by any means known in the art, such as by thermoforming and compression molding.

In any embodiment, a foamable resin according to the instant disclosure may comprise the propylene resin according to the instant disclosure and at least one nucleating agent. The feeding rate of foaming agent and nucleator are adjusted to achieve a relatively low density foam and small cell size, which results in a foam having thin cell walls.

In any embodiment, foams may be made by an extrusion process that is well known in the art wherein the extruders are longer than standard types, typically with an overall L/D ratio>40, in either a single or tandem extruder configuration. Melt temperature is one of the most important process parameters in foam extrusion. In any embodiment, the melt temperature may be in a range from approximately 130° C. to 180° C.

In any embodiment, a foamable resin may produce a foam having a void volume of at least 5%, or at least 10%, or at least 15%, or at least 20%, or at least 30%. Such void volume allows significant reduction in consumption of polymeric material. In any embodiment, the foamed material may have a void volume of at least 50%, or at least 60%, or at least 65%, or at least 70%, and at least 75%. Void volume, in this context, means initial void volume, i.e., typically void volume immediately after extrusion and cooling to ambient conditions. Void volume is calculated from the foam density determined according to ASTM D1622-08.

In any embodiment, the foam articles according to the instant disclosure may have a density of 320 kg/m³ or less, or 300 kg/m³ or less, or 200 kg/m³ or less, or 150 kg/m³ or less, or 130 kg/m³ or less, or 100 kg/m³ or less, or 90 kg/m³ or less, or 80 kg/m³ or less, or 70 kg/m³ or less, or 60 kg/m³ or less, wherein foam density is determined according to ASTM D1622-08.

In any embodiment, the foam articles according to the instant disclosure may have greater than 20% open cell, or from 30 to 70% open cell according to ASTM D2856-A. In any embodiment, the foam articles according to the instant disclosure may have 50% or more, or 70% or more, or 80% or more closed cells according to ASTM D2856-A.

In any embodiment, the foam articles according to the instant disclosure may have an average cell size of 3 mm or less, or 2 mm or less, or 1 mm or less according to ASTM D3576-04. In any embodiment, the foam articles according to the instant disclosure may have a cell size between 0.01 mm to 10 mm, or from 0.1 mm to 5 mm.

In any embodiment, the foam articles according to the instant disclosure may be used in any known application involving molding or extrusion, including consumer goods, industrial goods, construction materials, packaging materials, and automotive parts. In the case of food packaging, foams according to the instant disclosure offer a lightweight packaging solution with excellent grease/fat/oil resistance. Its high heat stability means products are microwaveable, with good thermal insulation giving them a 'cool touch' during removal.

Having described the various features of the inventive articles, described herein in numbered embodiments are:

E1. A molded article comprising a polypropylene resin, wherein the polypropylene resin comprises at least 50 mol % propylene, an MWD (Mw/Mn) greater than 5, a branching index (g') of at least 0.95, and a melt strength greater than 20 cN determined using an extensional rheometer at 190° C.

E2. The molded article of embodiment E1, wherein the MWD is from 6 to 15 and an MFR from 0.1 to 100, determined according to ASTM D1238 Condition L.

E3. The molded article of any of the above embodiments E1-E2, wherein the melt strength is from 50 cN to 200 cN.

E4. The molded article of any of the above embodiments E1-E3, wherein the polypropylene resin has a viscosity ratio of from 35 to 80 determined from the complex viscosity ratio at 0.01 to 100 rad/s angular frequency at a fixed strain of 10% at 190° C.

E5. The molded article of any of the above embodiments E1-E4, wherein the polypropylene resin has a heat distortion temperature of greater than or equal to 100° C., determined according to ASTM D648 using a load of 0.45 MPa (66 psi).

E6. The molded article of any of the above embodiments E1-E5, wherein the polypropylene resin is an impact copolymer.

E7. The molded article of any of the above embodiments E1-E6, wherein the polypropylene resin comprises from 0.1 to 10 mol % of a comonomer selected from the group consisting of ethylene and $C_4$ to $C_{20}$ olefins.

E8. The molded article of any of the above embodiments E1-E7, wherein the polypropylene resin comprises an isopentad percentage of greater than 95%.

E9. The molded article of any of the above embodiments E1-E8, wherein the polypropylene resin has a stiffness of from 2000 MPa (290 kpsi) to 2500 MPa (360 kpsi) determined according to ASTM D790A on samples nucleated with 0.1% sodium benzoate.

E10. The molded article of any of the above embodiments E1-E9, further comprising greater than or equal to 0.01 wt % of one or more additives selected from the group consisting of: reinforcing fillers; non-reinforcing fillers; scratch resistant agents; plasticizers; antioxidants; phosphites; anti-cling additives; tackifiers; UV stabilizers; heat stabilizers; anti-blocking agents; release agents; anti-static agents; pigments; colorants; dyes; waxes; silica; extender oils; lubricants; talc; anti-fogging agents; foaming agents; flame/fire retardants; blowing agents; vulcanizing agents; curative agents; vulcanizing accelerators; curative accelerators; cure retarders; processing aids; tackifying resins; and a combination thereof.

E11. The molded article of any of the above embodiments E1-E10, wherein the polypropylene resin is produced by contacting propylene monomers at propylene polymerization conditions with a catalyst system comprising a Ziegler-Natta catalyst comprising a non-aromatic internal electron donor and first and second external electron donors comprising different organosilicon compounds.

E12. The molded article of any of the above embodiments E1-E11, wherein the propylene resin is characterized by containing less than 1 gel having a size of 10 microns or less, and greater than 500 microns, wherein the gel content is determined by optical microscopy at 8× magnification of a 5 cm square of a blown film having a thickness of 37 microns (1.5 mils).

E13. A foamable resin comprising a propylene resin and from 0 to 10 wt % of a foaming agent, wherein prior to combination with foaming agent, the polypropylene resin comprises at least 50 mol % propylene, an MWD (Mw/Mn) greater than 5, a branching index (g') of at least 0.95, and a melt strength greater than 20 cN determined using an extensional rheometer at 190° C.

E14. The foamable resin of embodiment E13, wherein the resin is foamable to a density of less than or equal to 150 kg/m³.

E15. The foamable resin of any of the above embodiments E13-E14, wherein the MWD is from 6 to 15 and the melt strength is from 50 cN to 200 cN.

E16. The foamable resin of any of the above embodiments E13-E15, wherein the polypropylene resin has one or a combination of the following properties: (1) a viscosity ratio of from 35 to 80 determined from the complex viscosity ratio at 0.01 to 100 rad/s angular frequency at a fixed strain of 10% at 190° C.; (2) a heat distortion temperature of greater than or equal to 100° C., determined according to ASTM D648 using a load of 0.45 MPa (66 psi); (3) an isopentad percentage of greater than 95%; (4) an MFR from 0.1 to 100, determined according to ASTM D1238 Condition L; and (5) a stiffness of from 2000 MPa (290 kpsi) to 2500 MPa (360 kpsi) determined according to ASTM D790A on samples nucleated with 0.1% sodium benzoate.

E17. A foamed article comprising a propylene resin and from 0 to 10 wt % of a foaming agent, wherein the propylene resin is foamed to a density of less than or equal to 320 kg/m³, wherein the polypropylene resin comprises at least 50 mol % propylene, an MWD (Mw/Mn) greater than 5, a branching index (g') of at least 0.95, and a melt strength greater than 20 cN determined using an extensional rheometer at 190° C.

E18. A method of making a molded article comprising molding polypropylene resin comprising at least 50 mol % propylene, an MWD (Mw/Mn) greater than 5, a branching index (g') of at least 0.95, and a melt strength greater than 20 cN determined using an extensional rheometer at 190° C.

E19. The method of embodiment E18, wherein the molding comprises injection molding, multi-shot injection molding, gas-assisted injection molding, extrusion blow molding, injection blow molding, injection stretch blow molding, compression molding, rotational molding, foam molding, thermoforming, sheet extrusion, profile extrusion, elasto-welding, gas foaming, film blowing, or a combination thereof.

E20. The method of any of the above embodiments E18-E19, further comprising downgauging the polypropylene resin by from 5 wt % to 10 wt %.

E21. The method of any of the above embodiments E18-E20, further comprising drawing down the polypropylene resin at a draw down depth to width ratio of greater than or equal to 2:1.

E22. The method of any of the above embodiments E18-E21, wherein the polypropylene resin is produced by contacting propylene monomers at propylene polymerization conditions with a catalyst system comprising a Ziegler-Natta catalyst comprising a non-aromatic internal electron donor and first and second external electron donors comprising different organosilicon compounds.

E23. A method of making a foamed article comprising foaming a propylene resin with from 0 to 10 wt % of a foaming agent to a density of less than or equal to 320 kg/m$^3$, wherein the polypropylene resin comprises at least 50 mol % propylene, an MWD (Mw/Mn) greater than 5, a branching index (g') of at least 0.95, and a melt strength greater than 20 cN determined using an extensional rheometer at 190° C.

E24. The method of embodiment E23, wherein the MWD is from 6 to 15, the melt strength is from 50 cN to 200 cN and wherein the polypropylene resin has one or a combination of the following properties: (1) a viscosity ratio of from 35 to 80 determined from the complex viscosity ratio at 0.01 to 100 rad/s angular frequency at a fixed strain of 10% at 190° C.; (2) a heat distortion temperature of greater than or equal to 100° C., determined according to ASTM D648 using a load of 0.45 MPa (66 psi); (3) an isopentad percentage of greater than 95%; (4) an MFR from 0.1 to 100, determined according to ASTM D1238 Condition L; and (5) a stiffness of from 2000 MPa (290 kpsi) to 2500 MPa (360 kpsi) determined according to ASTM D790A on samples nucleated with 0.1% sodium benzoate.

E25. The method of any of the above embodiments E23-E24, wherein the polypropylene resin is produced by contacting propylene monomers at propylene polymerization conditions with a catalyst system comprising a Ziegler-Natta catalyst comprising a non-aromatic internal electron donor and first and second external electron donors comprising different organosilicon compounds.

E26. A molded article comprising a polypropylene resin, wherein the polypropylene resin is according to any of the embodiments or a combination of embodiments disclosed herein.

E27. A molded article comprising a polypropylene resin, wherein the polypropylene resin is produced according to any of the methods, or a combination of methods disclosed herein.

E28. A molded article comprising a polypropylene resin, comprising:
  at least 50 mol % propylene;
  an MWD (Mw/Mn) greater than 5;
  a branching index (g') of at least 0.95; and
  a melt strength greater than 20 cN determined using an extensional rheometer at 190° C., wherein the polypropylene resin is produced according to any of the methods or a combination of the methods disclosed herein.

E29. A foamable resin comprising a polypropylene resin, wherein the polypropylene resin is according to any of the embodiments or a combination of embodiments disclosed herein.

E30. A foamable resin comprising a polypropylene resin, wherein the polypropylene resin is produced according to any of the methods, or a combination of methods disclosed herein.

E31. A foamable resin comprising a polypropylene resin, comprising:
  at least 50 mol % propylene;
  an MWD (Mw/Mn) greater than 5;
  a branching index (g') of at least 0.95; and a melt strength greater than 20 cN determined using an extensional rheometer at 190° C., wherein the polypropylene resin is produced according to any of the methods or a combination of the methods disclosed herein.

E32. A foamed article comprising a polypropylene resin, wherein the polypropylene resin is according to any of the embodiments or a combination of embodiments disclosed herein.

E33. A foamed article comprising a polypropylene resin, wherein the polypropylene resin is produced according to any of the methods, or a combination of methods disclosed herein.

E34. A foamed article comprising a polypropylene resin, comprising:
  at least 50 mol % propylene;
  an MWD (Mw/Mn) greater than 5;
  a branching index (g') of at least 0.95; and
  a melt strength greater than 20 cN determined using an extensional rheometer at 190° C., wherein the polypropylene resin is produced according to any of the methods or a combination of the methods disclosed herein.

E35. A method of making a molded article comprising molding polypropylene resin, wherein the polypropylene resin is according to any of the embodiments or a combination of embodiments disclosed herein.

E36. A method of making a molded article comprising molding polypropylene resin, wherein the polypropylene resin is produced according to any of the methods, or a combination of methods disclosed herein.

E37. A method of making a molded article comprising molding polypropylene resin comprising:
  at least 50 mol % propylene;
  an MWD (Mw/Mn) greater than 5;
  a branching index (g') of at least 0.95; and
  a melt strength greater than 20 cN determined using an extensional rheometer at 190° C., wherein the polypropylene resin is produced according to any of the methods or a combination of the methods disclosed herein.

E38. A method of making a foamed article comprising foaming a propylene resin with from 0 to 10 wt % of a foaming agent to a density of less than or equal to 320 kg/m$^3$, wherein the polypropylene resin is according to any of the embodiments or a combination of embodiments disclosed herein.

E39. A method of making a foamed article comprising foaming a propylene resin with from 0 to 10 wt % of a foaming agent to a density of less than or equal to 320 kg/m³, wherein the polypropylene resin is produced according to any of the methods, or a combination of methods disclosed herein.

E40. A method of making a foamed article comprising foaming a propylene resin with from 0 to 10 wt % of a foaming agent to a density of less than or equal to 320 kg/m³, wherein the polypropylene resin comprises:
- at least 50 mol % propylene;
- an MWD (Mw/Mn) greater than 5;
- a branching index (g') of at least 0.95; and
- a melt strength greater than 20 cN determined using an extensional rheometer at 190° C., wherein the polypropylene resin is produced according to any of the methods or a combination of the methods disclosed herein.

EXAMPLES

The following ASTM test methods in Table 1 and described below were utilized for the physical property measurements.

TABLE 1

Test Methods

| PROPERTY | ASTM METHOD |
|---|---|
| Melt Flow Rate (g/10 min) | D 1238, Condition L |
| 1% Secant Flexural Modulus, MPa (psi) | D 790 A |
| Tensile strength at Yield, MPa (psi) | D 638 |
| Elongation at Yield (%) | D 638 |
| Elongation at Break (%) | D 638 |
| Notched Izod Impact Strength J/m (ft-lbs/in) | D 256 |
| Heat Distortion Temperature (HDT) @ 66 psi load (° C.) | D 648 |
| Rockwell Hardness, R-Scale | D 785 |
| Gloss at 60° | D 523 |

Melt Flow Rate (MFR): MFR is measured as per ASTM D1238, condition L, at 230° C. and 2.16 kg load using a melt indexer.

Flexural Modulus: The flexural modulus is measured according to ASTM D790A, using a crosshead speed of 1.27 mm/min (0.05 in/min), and a support span of 50.8 mm (2.0 in) using an Instron machine.

Tensile Strength: The Tensile Strength at yield, elongation at yield and elongation at break were measured as per ASTM D638, with a crosshead speed of 50.8 mm/min (2.0 in/min), and a gauge length of 50.8 mm (2.0 in), using an Instron Machine.

Notched Izod Impact Strength: The Notched Izod Impact Strength is measured as per ASTM D256 at room temperature (21° C.), using an equipment made by Empire Technologies Inc.

Heat Distortion Temperature (HDT): The HDT is measured according to ASTM D648, using a load of 0.45 MPa (66 psi).

Polydispersity Index (PI): The Polydispersity Index is obtained from oscillatory shear data, from the cross-over modulus and frequency as measured at 190° C. as described in Zeichner G R, Patel P D (1981), "A Comprehensive Study of Polypropylene Melt Rheology"; Proceedings of the 2nd World Congress of Chemical Engineering, Montreal, Canada.

Polymerization of Example 1

Example 1 was produced in a pilot plant conditions in a continuous stirred tank reactor (CSTR). The magnesium chloride supported titanium catalyst, sold commercially as Avant ZN-168M, is utilized with an external donor blend of propyltriethoxysilane and dicyclopentyldimethoxysilane. The catalyst composition preparation is carried out continuously in situ by contacting the catalyst solids, triethylaluminum, and the external electron donor system under the conditions known in the art to yield active, stereospecific catalyst for polymerization of propylene. The activated catalyst was continuously fed to a prepolymerization reactor where it was polymerized in propylene to a productivity of approximately 100 to 300 g-polymer/g-cat. The prepolymerized catalyst was then continuously fed to a continuously stirred tank reactor and polymerization continued at a reactor temperature of 70° C. to yield homopolymer. The hydrogen (chain transfer agent) concentration used in the reactor as show in Table 2. The reactor slurry was continuously removed from the polymerization reactor and the homopolymer granules are continuously separated from the liquid propylene. The granules were passed through a dryer to remove the residual monomer and collected in Gaylord boxes. Examples 2-7 were produced in the same way with varying hydrogen levels in the reactor to achieve the desired melt flow rate (MFR).

The homopolymer granules from the reactor were stabilized with 0.090 wt % Irganox™ 1010, 0.045 wt % Ultranox™ 626A, and 0.10 wt % sodium benzoate (fine form), and pelletized on a twin screw extruder (Werner Pfliederer 30 mm) The pellets were then injection molded using ASTM test specimens and the physical properties tested as per ASTM guidelines.

TABLE 2

Polypropylene homopolymers.

| Property | Example 1 | Example 2 | Example 3 | Example 4 | Example 5 | Example 6 | Example 7 | Example 8 |
|---|---|---|---|---|---|---|---|---|
| MFR (g/10 min) | 0.9 | 1.0 | 1.4 | 1.8 | 11.7 | 15.6 | 37.8 | 63.4 |
| MWD (PI¹) | 7.6 | 7.8 | 8.3 | 8.7 | 8.3 | 8.3 | 8.2 | — |
| Tensile at Yield MPa (psi) | 40 (5858) | 39 (5718) | 41 (5893) | 41 (5915) | 42 (6111) | 43 (6185) | 43 (6200) | 41 (5942) |
| 1% Sec Flex Modulus MPa (kpsi) | 2200 (319) | 2048 (297) | 2276 (330) | 2166 (314) | 2386 (346) | 2413 (350) | 2428 (352) | 2407 (349) |
| HDT (° C.) | 124 | 125 | 125 | — | 128 | 127 | 128 | 128 |
| Room Temp. Notched Izod J/m (ft-lbs/in) | 16 (0.3) | 21 (0.4) | 16 (0.3) | 32 | 21 (0.4) | 16 (0.3) | 11 (0.2) | 11 (0.2) |
| Rockwell Hardness | 113 | 112 | 113 | 112 | 115 | 115 | 116 | 116 |
| Gloss at 60° | 90 | 90 | 90 | 90 | 89 | 89 | 89 | 88 |

TABLE 2-continued

| Polypropylene homopolymers. | | | | | | | | |
|---|---|---|---|---|---|---|---|---|
| Property | Example 1 | Example 2 | Example 3 | Example 4 | Example 5 | Example 6 | Example 7 | Example 8 |
| Melt Strength (cN) | 43[3] | 52[3]/81 | 30[3] | — | — | — | — | — |
| Viscosity Ratio[2] | 66 | 41 | 59 | 53.5 | 15 | 20 | 14 | — |

PI: Polydispersity Index
Viscosity ratio - complex viscosity ratio at 0.01/100 angular frequency rad/sec.
Non-optimized addpack Comparative Example 1 is ExxonMobil PP6262 and Comparative Example 2 is a commercial grade polymer made with methylcyclohexyl dimethoxy silane (MCMS) external donor and a commercial catalyst solids THC-C series supplied by Toho Titanium Co. Comparative Example 3 is Borealis Daploy™ WB135HMS, a commercial grade post reactor grafted polypropylene. The data are shown in Table 3.

TABLE 3

| Comparative Examples. | | | |
|---|---|---|---|
| Property | Comparative Example 1 | Comparative Example 2 | Comparative Example 3 |
| MFR (g/10 min) | 2.8 | 2.1 | 2.5 |
| MWD (PI[1]) | 4.5 | 4.2 | — |
| Tensile at Yield MPa (psi) | 37 (5340) | 38 (5530) | 48 (6918) |
| 1% Sec Flex Modulus MPa (kpsi) | 1740 (248) | 1903 (276) | 1986 (288) |
| HDT (° C.) | 100 | 122 | — |
| Room Temp. Notched Izod J/m (ft-lbs/in) | 50 (0.93) | 52 (0.99) | — |
| Melt Strength (cN) | 5 | 5 | 29 |
| Viscosity Ratio[2] | — | 15-20 | 62 |

PI: Polydispersity Index
Viscosity ratio—complex viscosity ratio at 0.01/100 angular frequency rad/sec.

FIG. 1 shows the branching index g' of Example 2, indicating no evidence of long chain branching. As is known to one of skill in the art, long chain branched polymers have a branching index g' which decreases significantly lower than 1, yet as is shown in FIG. 1, the g' value remains close to 1.

The branching index ($g'_{vis}$, also referred to herein as g') is calculated using the output of the SEC-DRI-LS-VIS method (described in page 37 of U.S. Pat. No. 7,807,769 for g') as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits. The branching index $g'_{vis}$ is defined as:

$$g'_{vis} = \frac{[\eta]_{avg}}{k M_v^\alpha}$$

Figure 2:
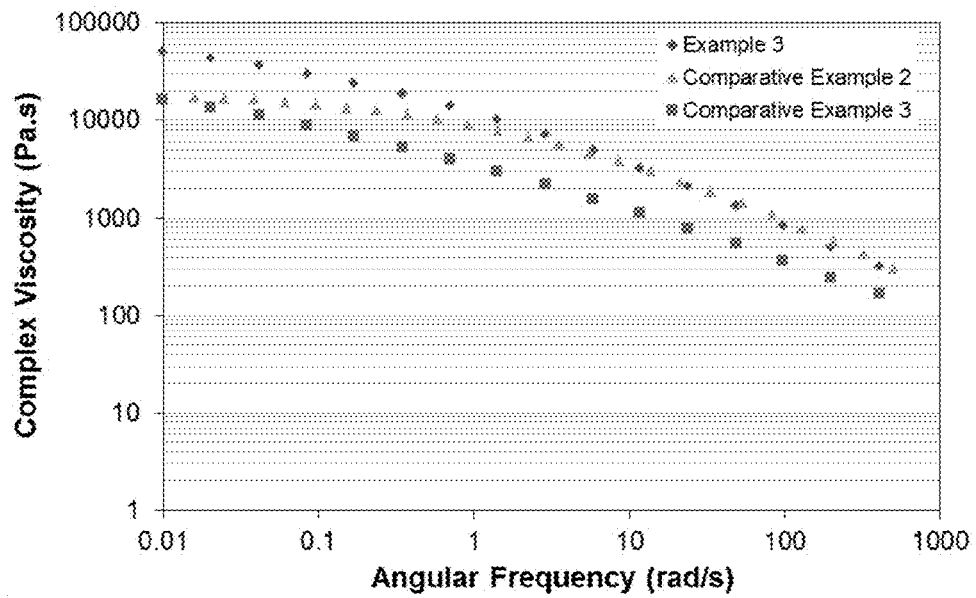
FIG. 2 shows a plot of the complex viscosity vs. the angular frequency of a propylene resin produced according to the instant disclosure.

FIG. 2 shows the complex viscosity vs. angular frequency for Example 3 in comparison to Comparative Examples 1 and 3.

Figure 3:
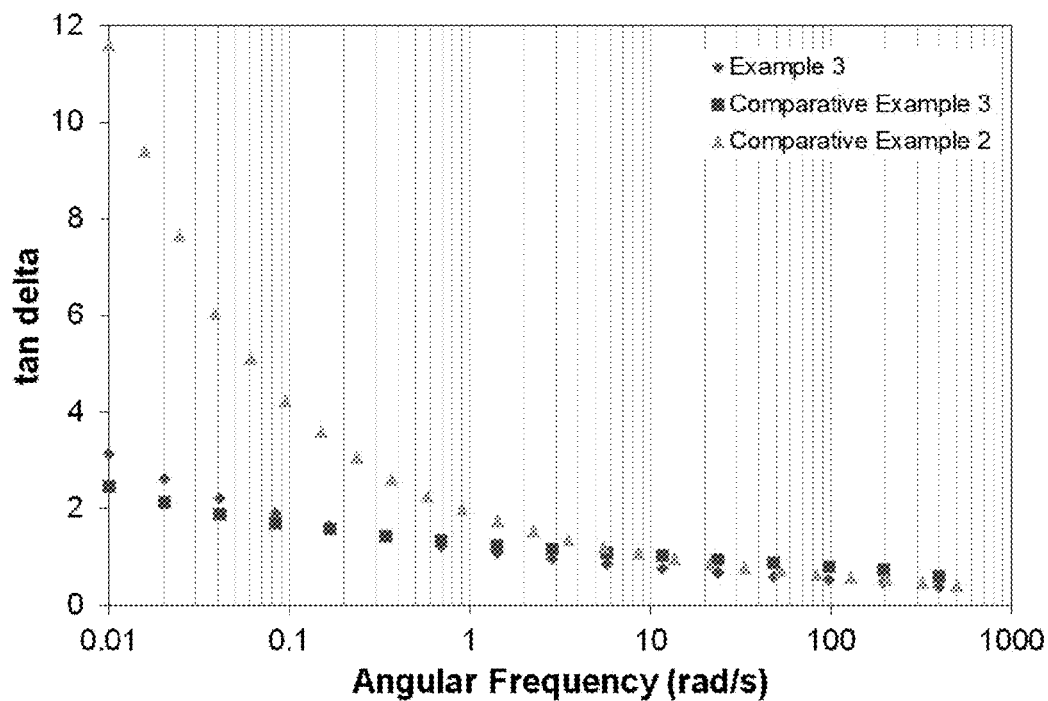
FIG. 3 shows a plot of the dissipation factor (tan delta) vs. the angular frequency of a propylene resin produced according to the instant disclosure.

FIG. 3 shows the Dissipation Factor (tan delta) vs. angular frequency for Example 3 in comparison to Comparative Examples 1 and 3. All rheological experiments were conducted with an Anton Paar MCR500 Rheometer equipped with a 25 mm diameter parallel-plate fixture. Disk samples were prepared by compression molding to a thickness of 2.5 mm and diameter of 25 mm. The gap between the two parallel plates was maintained at 1.90 mm for all measurements. Small-amplitude oscillatory shear tests were performed as a function of angular frequency ([omega]) ranging from 0.01 to 500 rad/s at 190° C. A fixed strain of 10% was used to ensure that measurements were carried out within the linear viscoelastic range of the materials investigated.

Dissipation factor (tan delta) is the ratio of loss modulus (G") to the storage module (G') and indicates the viscous and elastic component. The lower the tan delta, the more share of the elastic component. Tan delta in PP can be lowered by long chain branching (Comparative Example 3) or by broadening of molecular weight distribution (Example 3). Typical PP (Comparative Example 1) showed high tan delta.

Gel Analysis on Blown Films:

The blown films made from Comparative Example 1 and Example 2 on a Brabender film extrusion line with a thickness of 1.5 mils (0.0015 inches) were evaluated visually for gel defects. The area analyzed is 2×2 inches (5 cm square). The extruder was run at a screw rpm (revolutions per minute) of 60, and with a temperature profile in Zone 1, Zone 2, Zone 3, and Zone 4, and die melt temperatures at 190° C., 270° C., 265° C., 260° C., and 220° C. respectively. The quantification on the gel defects on the two films is shown in Table 4.

TABLE 4

| Gel Defect in articles | | |
|---|---|---|
| Property | Comparative Example 1 | Example 2 |
| Gels > 500 microns | 40 | 0 |
| Gels < 10 microns | 320 | 0 |

High melt strength property enabled the broad molecular weight distribution polypropylene in this invention to participate in applications such as foaming, thermoforming, blown film, thermoplastic vulcanizates base stock, profile extrusion, biaxially oriented film, blow molding, extrusion coating, and other related applications.

Polypropylene resins were processed in a tandem extrusion process using two extruders (single screw and twin screw). Optionally, a twin screw single extruder with L/D ratio greater 40 was used in place of two tandem extruders. The first extruder is used to mix and melt the pellets with physical blowing agents (isobutane or isopentane). The second extruder allows the polymer melt blend to cool to typical foam temperatures. The exemplified polypropylene according to the instant disclosure was cooled to around 159-163° C. The new inventive polypropylene in the Example 3 and 4 (without nucleation) was able to foam at a reduced density of 240-320 kg/m$^3$ (15-20 lb/ft$^3$) down from 900 kg/m$^3$ (56.2 lb/ft$^3$). In contrast, typical polypropylene in Comparative Examples 1 or 2 was not able to make any foam parts because it is not able to hold the cell structure prior to collapsing. Comparative Example 3, a long chain branched post reactor grafted polypropylene was also evaluated under the same conditions and produced a foam having a density of 160-192 kg/m$^3$ (10-12 lb/ft$^3$). The polypropylene according to the instant disclosure to produce a foam can be with or without nucleation.

For purposes herein, density of a foam sample is measured by measuring the volume of water in water immersion test on a known mass of 5 cm$^2$ (2 inch by 2 inch) or a 10 cm$^2$ (4 inch by 4 inch) foamed sheet. In certain cases, the volume was measured using the sheet area and thickness.

Thermoforming of the instant broad molecular weight distribution polypropylene exhibited good processability due to its high melt strength.

In addition, in all the applications tested, we have not seen any evidence of gel issue which is common for broad molecular weight distribution polypropylene in the past. Gel issue is also common for both the linear high molecular weight polypropylene and Y/H-shaped polypropylenes from post-reactor processes as evidenced by Comparative Example 3.

The thermoformed parts exemplified herein were drink cups: 96.6 mm rim diameter and 139 mm deep, made from sheets having a 356 mm (14 inch) width and a thickness of 1.9 mm (a range of 1.7 to 1.9 mm) The sheets are thermoformed using solid phase thermoforming on a 356 mm (14 inch line) at temperatures of 156-160° C., which are slightly below the melting temperatures of polypropylene. The inventive polypropylene of Examples 1 and 3 (with 0.04 wt % HPN-600Ei™ (Milliken & Company, Spartanburg, S.C., USA) nucleation was able to form similar thermoformed parts with thinner sheets (1.7 and 1.8 mm) and still gives similar top load and side wall compression values as typical polypropylene in Comparative Example 1 with 0.04 wt % HPN-600Ei™ nucleation. On average, the polypropylene according to embodiments disclosed herein, and shown in Examples 1 and 3, provide a potential 5-10% downgauge capability as a result of improved stiffness and higher melt strength (more uniform part). The drink cups have draw ratio H of 1.4 (i.e., the ratio of part depth to diameter is called draw ratio, date for which is in Table 5.

TABLE 5

Inventive thermoformed parts

| Material | Sheet Thickness (mm) | Wall Cup Thickness (mm) | Nucleation (wt % HPN-600ei) | Top Load Compression/Peak Load (N) | Side Wall Compression/Peak Load @ 10 mm (N) |
| --- | --- | --- | --- | --- | --- |
| Example 3 (w/o nucleation) | 1.9 | 0.25 to 0.29 | 0.04 | 305 | 5.5 |
| Example 3 (w/o nucleation) | 1.8 | 0.24 to 0.28 | 0.04 | 265 | 4.9 |
| Example 3 (w/o nucleation) | 1.7 | 0.23 to 0.27 | 0.04 | 240 | 4.3 |
| Example 1 (w/o nucleation) | 1.9 | 0.25 to 0.30 | 0.04 | 298 | 5.4 |
| Example 1 (w/o nucleation) | 1.7 | 0.23 to 0.27 | 0.04 | 237 | 4.2 |
| Comparative Example 1 (w/o nucleation) | 1.9 | 0.24 to 0.29 | 0.04 | 255 | 4.8 |

The examples also provided another benefit inherent with the broad molecular weight distribution polypropylene in this invention which is a higher stiffness (15-25%) compared to typical polypropylene. The extra stiffness enabled the broad molecular weight distribution polypropylene to participate in selective applications that allowed for downgauging opportunities while maintaining critical properties. In injection molded ASTM D790 flexural modulus testing, broad molecular weight distribution polypropylene showed 15-25% higher stiffness than typical polypropylene. The higher stiffness was also demonstrated in blown film trials where the bending stiffness of coextruded blown films with the broad molecular weight distribution polypropylene in the inner layers enabled—20% downgauging of the overall film structure.

We claim:

1. A molded article comprising a polypropylene resin, wherein the polypropylene resin comprises at least 50 mol % propylene, an MWD (Mw/Mn) greater than 5, a branching index (g') of at least 0.95, and a melt strength greater than 20 cN determined using an extensional rheometer at 190° C.; wherein the polypropylene resin is produced by contacting propylene monomers at propylene polymerization conditions with a catalyst system comprising a Ziegler-Natta catalyst comprising a non-aromatic internal electron donor and first and second external electron donors comprising different organosilicon compounds.

2. The molded article of claim 1, wherein the MWD is from 6 to 15 and an MFR from 0.1 to 100, determined according to ASTM D1238 Condition L.

3. The molded article of claim 1, wherein the melt strength of the polypropylene resin is from 50 cN to 200 cN.

4. The molded article of claim 1, wherein the polypropylene resin has a viscosity ratio of from 35 to 80 determined from the complex viscosity ratio at 0.01 to 100 rad/s angular frequency at a fixed strain of 10% at 190° C.

5. The molded article of claim 1, wherein the polypropylene resin has a heat distortion temperature of greater than or equal to 100° C., determined according to ASTM D648 using a load of 0.45 MPa (66 psi).

6. The molded article of claim 1, wherein the polypropylene resin is an impact copolymer.

7. The molded article of claim 1, wherein the polypropylene resin comprises from 0.1 to 10 mol % of a comonomer selected from the group consisting of ethylene and $C_4$ to $C_{20}$ olefins.

8. The molded article of claim 1, wherein the polypropylene resin comprises an isopentad percentage of greater than 95%.

9. The molded article of claim 1, wherein the polypropylene resin has a stiffness of from 2000 MPa (290 kpsi) to 2500 MPa (360 kpsi) determined according to ASTM D790A on samples nucleated with 0.1% sodium benzoate.

10. The molded article of claim 1, further comprising greater than or equal to 0.01 wt % of one or more additives selected from the group consisting of: reinforcing fillers; non-reinforcing fillers; scratch resistant agents; plasticizers; antioxidants; phosphites; anti-cling additives; tackifiers; UV stabilizers; heat stabilizers; anti-blocking agents; release agents; anti-static agents; pigments; colorants; dyes; waxes; silica; extender oils; lubricants; talc; anti-fogging agents; foaming agents; flame/fire retardants; blowing agents; vulcanizing agents; curative agents; vulcanizing accelerators; curative accelerators; cure retarders; processing aids; tackifying resins; and a combination thereof.

11. The molded article of claim 1, wherein the propylene resin is characterized by containing less than 1 gel having a size of 1 micron or larger, wherein the gel content is determined by optical microscopy at 8× magnification of a 5 cm square of a blown film having a thickness of 0.04 mm (1.5 mils).

\* \* \* \* \*